(12) United States Patent
Yamada et al.

(10) Patent No.: US 9,653,952 B2
(45) Date of Patent: May 16, 2017

(54) HALF PERMANENT MAGNET MOTOR

(71) Applicant: Asmo Co., LTD., Shizuoka-ken (JP)

(72) Inventors: Yoji Yamada, Hamamatsu (JP); Seiya Yokoyama, Toyohashi (JP); Shigemasa Kato, Toyohashi (JP); Yoshiaki Takemoto, Toyohashi (JP); Yoko Tateishi, Kosai (JP)

(73) Assignee: Amso Co., LTD., Shizuoka-Ken (JP)

( * ) Notice: Subject to any disclaimer, the term of this patent is extended or adjusted under 35 U.S.C. 154(b) by 0 days.

(21) Appl. No.: 14/287,536

(22) Filed: May 27, 2014

(65) Prior Publication Data

US 2014/0265706 A1    Sep. 18, 2014

Related U.S. Application Data

(62) Division of application No. 12/752,755, filed on Apr. 1, 2010, now abandoned.

(30) Foreign Application Priority Data

Apr. 3, 2009  (JP) .................................. 2009-091225
Apr. 3, 2009  (JP) .................................. 2009-091374

(Continued)

(51) Int. Cl.
    *H02K 1/27*    (2006.01)
    *H02K 1/24*    (2006.01)
    (Continued)

(52) U.S. Cl.
    CPC ............. *H02K 1/24* (2013.01); *H02K 1/2746* (2013.01); *H02K 29/03* (2013.01); *H02K 21/16* (2013.01); *H02K 2213/03* (2013.01)

(58) Field of Classification Search
    CPC .......................................... H02K 1/27–1/2793
    (Continued)

(56) References Cited

U.S. PATENT DOCUMENTS 4,661,736 A * 4/1987 Kawada et al. ......... 310/156.15
5,475,277 A   12/1995 Johnson
(Continued)

FOREIGN PATENT DOCUMENTS

JP    08-205437    8/1996
JP    09-327139    12/1997
(Continued)

OTHER PUBLICATIONS

J.R. Hendershot Jr., Design of Brushless Permanent-Magnet Motors, Magna Physics Publishing and Clarendon Press Oxford 1994, pp. 10, 12 and 13.*

(Continued)

*Primary Examiner* — Thomas Truong
(74) *Attorney, Agent, or Firm* — James R. Gourley; Carstens & Cahoon, LLP

(57) ABSTRACT

A motor includes a rotor and a stator. The rotor includes a plurality of magnets, which function as first magnetic poles, and salient poles, which function as second magnetic poles. A ratio X1:X2 of a quantity X1 of magnetic pole portions of the rotor, which is the sum of the quantity of the magnets and the quantity of the salient poles, and the quantity X2 of slots is 2n:3n (n being a natural number). The sum of a magnetic pole occupying angle θ1 of the magnet and a magnetic pole occupying angle θ2 of the salient pole is 360°. The magnetic pole occupying angle θ1 is set in a range of 180°<θ1≤230°.

10 Claims, 22 Drawing Sheets

(30) Foreign Application Priority Data

| Apr. 10, 2009 | (JP) | ................................. 2009-096430 |
| Apr. 16, 2009 | (JP) | ................................. 2009-100080 |
| Mar. 30, 2010 | (JP) | ................................. 2010-079734 |

(51) Int. Cl.
*H02K 29/03* (2006.01)
*H02K 21/16* (2006.01)

(58) Field of Classification Search
USPC ............ 310/156.44, 156.45, 156.38, 156.01
See application file for complete search history.

(56) References Cited

U.S. PATENT DOCUMENTS

| 5,631,512 | A | * | 5/1997 | Kawabata et al. ....... 310/156.15 |
| 5,670,838 | A | * | 9/1997 | Everton .................. H02K 1/16 |
| | | | | 310/216.008 |
| 5,682,073 | A | * | 10/1997 | Mizuno ............... H02K 21/046 |
| | | | | 310/156.25 |
| 5,886,440 | A | * | 3/1999 | Hasebe et al. ........... 310/156.19 |
| 5,936,322 | A | | 8/1999 | Yamaguchi |
| 6,597,079 | B2 | * | 7/2003 | Miyashita et al. ....... 310/156.48 |
| 7,288,868 | B2 | * | 10/2007 | Tamaki et al. ............ 310/254.1 |
| 2002/0047432 | A1 | | 4/2002 | Miyashita |
| 2002/0117934 | A1 | | 8/2002 | Kanazawa |
| 2004/0007930 | A1 | | 1/2004 | Asai |
| 2004/0017123 | A1 | | 1/2004 | Miyashita |
| 2004/0124733 | A1 | * | 7/2004 | Yamamoto ............. B29C 70/72 |
| | | | | 310/216.044 |
| 2004/0135454 | A1 | | 7/2004 | Takahashi |
| 2004/0201299 | A1 | | 10/2004 | Naritomi |
| 2005/0040723 | A1 | | 2/2005 | Asai |
| 2007/0046138 | A1 | | 3/2007 | Ooiwa |
| 2008/0104826 | A1 | | 5/2008 | Ooiwa |
| 2010/0301695 | A1 | | 12/2010 | Yamada et al. |

FOREIGN PATENT DOCUMENTS

| JP | 09327139 | A | * | 12/1997 |
| JP | 10-066286 | | | 3/1998 |
| JP | 10-150755 | | | 6/1998 |
| JP | 2002-165394 | | | 6/2002 |
| JP | 2002-262530 | | | 9/2002 |
| JP | 2002-262533 | | | 9/2002 |
| JP | 2003-032929 | | | 1/2003 |
| JP | 2004-201406 | | | 7/2004 |
| JP | 2004-236471 | | | 8/2004 |
| JP | 2004-328989 | | | 11/2004 |
| JP | 2004-357489 | | | 12/2004 |
| JP | 2005-287265 | | | 10/2005 |
| JP | 2007-068361 | | | 3/2007 |
| JP | 2007-259513 | | | 10/2007 |
| JP | 2007-336624 | A | | 12/2007 |
| JP | 2008-125203 | A | | 5/2008 |
| JP | 2008-178165 | | | 7/2008 |
| JP | 2010-263774 | A | | 11/2010 |

OTHER PUBLICATIONS

Machine Translation, Murakami, JP 09327139 A, Dec. 16, 1997.*
Hendershot, J.R., et al., Design of Brushless Permanent-Magnet Motors, Magna Physic Publishing 1994, pp. 10-13.
JP 09327139A, JPO Machine translation, "Rotor for Motor," Feb. 11, 2012, http://dossier.ipdl.inpit.go.jp/text_trans.html.
JP 2008-178165 A Machine Translation, Jul. 31, 2008.

* cited by examiner

HALF PERMANENT MAGNET MOTOR

CROSS-REFERENCE TO RELATED APPLICATIONS

This application is a divisional of U.S. application Ser. No. 12/752,755, entitled "Half Permanent Magnet Motor" filed Apr. 1, 2010, which claims priority to the following Japanese applications: JP 2009-091225 filed Apr. 3, 2009; JP 2009-091374 filed Apr. 3, 2009; JP 2009-096430 filed Apr. 10, 2009; JP 2009-100080 filed Apr. 16, 2009; and JP 2010-079734 filed Mar. 30, 2010, the technical disclosures of which are hereby incorporated herein by reference.

BACKGROUND OF THE INVENTION

The present invention relates to a rotor having a consequent pole type structure and a motor including such a rotor.

Japanese Laid-Open Patent Publication No. 9-327139 discloses a rotor having the so-called consequent pole type structure as one example of a rotor used in a motor. The rotor described in the publication includes a plurality of magnets, which are arranged in a circumferential direction of a rotor core, and salient poles, which are arranged between the magnets and formed integrally with the rotor core. The plurality of magnets function as one magnetic pole, and the plurality of salient poles function as the other magnetic pole.

The rotor having the consequent pole type structure that is disclosed in the publication includes the magnets, which generate a magnetic flux, and the salient poles, which do not generate a magnetic flux. Thus, there is a tendency for a magnetic unbalance to occur in the consequent pole type structure rotor. This increases torque ripple or the like and thereby lowers the rotation performance.

SUMMARY OF THE INVENTION

It is an object of the present invention to provide a rotor and a motor that optimizes the shape of each salient pole and magnet and improves the rotation performance.

To achieve the above object, a first aspect of the present invention provides a motor including a rotor and a stator. The rotor includes a rotor core, a plurality of magnets, and salient poles. The plurality of magnets are arranged along a circumferential direction of the rotor core to function as first magnetic poles. The salient poles are formed integrally with the rotor core and arranged between adjacent ones of the magnets in the circumferential direction to function as second magnetic poles. The stator is arranged facing toward the rotor and includes a plurality of slots. The magnets and salient poles each have a quantity in which the quantities sum together to a quantity x1 of magnetic pole portions of the rotor, and the slots are in a quantity x2. A ratio x1:x2 of the quantity of the magnetic pole portions to the quantity of the slots is 2n:3n (n being a natural number). An electrical angle corresponding to an angular range from an initiating point, which is set between each magnet and the salient pole that is adjacent to one side of the magnet in the circumferential direction, to a terminating point, which is set between the magnet and the salient pole that is adjacent to the other side of the magnet in the circumferential direction, is defined as a magnetic pole occupying angle $\theta 1$ of each of the magnets. An electrical angle corresponding to an angular range between the initiating point and the terminating point on two sides of each salient pole in the circumferential direction is defined as a magnetic pole occupying angle $\theta 2$ of each of the salient poles. The sum of the magnetic pole occupying angle $\theta 1$ and the magnetic pole occupying angle $\theta 2$ is 360°. The magnetic pole occupying angle $\theta 1$ is set in a range of $180° < \theta 1 \leq 230°$.

A second aspect of the present invention provides a motor including a rotor and a stator. The rotor includes a rotor core, a plurality of magnets, and salient poles. The plurality of magnets are arranged along a circumferential direction of the rotor core to function as first magnetic poles. The salient poles are formed integrally with the rotor core and arranged between adjacent ones of the magnets in the circumferential direction to function as second magnetic poles. The stator is arranged facing toward the rotor and includes a plurality of slots. The magnets and salient poles each have a quantity in which the quantities sum together to a quantity x1 of magnetic pole portions of the rotor, and the slots are in a quantity x2. A ratio x1:x2 of the quantity of the magnetic pole portions to the quantity of the slots is 3n−1:3n (n being an odd number that is greater than or equal to 3) or 3n−2:3n (n being an even number that is greater than or equal to 4). An electrical angle corresponding to an angular range from an initiating point, which is set between each magnet and the salient pole that is adjacent to one side of the magnet in the circumferential direction, to a terminating point, which is set between the magnet and the salient pole that is adjacent to the other side of the magnet in the circumferential direction, is defined as a magnetic pole occupying angle $\theta 1$ of each of the magnets. An electrical angle corresponding to an angular range between the initiating point and the terminating point on two sides of each salient pole in the circumferential direction is defined as a magnetic pole occupying angle $\theta 2$ of each of the salient poles. The sum of the magnetic pole occupying angle $\theta 1$ and the magnetic pole occupying angle $\theta 2$ is 360°. The magnetic pole occupying angle $\theta 1$ is set in a range of $180° < \theta 1 \leq 210°$.

A third aspect of the present invention provides a motor including a rotor and a stator. The rotor includes a rotor core, a plurality of magnets, and salient poles. The plurality of magnets are arranged along a circumferential direction of the rotor core to function as first magnetic poles. The salient poles are formed integrally with the rotor core and arranged between adjacent ones of the magnets in the circumferential direction to function as second magnetic poles. A stator is arranged facing toward the rotor and includes a plurality of slots. The magnets and salient poles each have a quantity in which the quantities sum together to a quantity x1 of magnetic pole portions of the rotor, and the slots are in a quantity x2. A ratio x1:x2 of the quantity of the magnetic pole portions to the quantity of the slots is 3n+1:3n (n being an odd number) or 3n+2:3n (n being an even number). An electrical angle corresponding to an angular range from an initiating point, which is set between each magnet and the salient pole that is adjacent to one side of the magnet in the circumferential direction, to a terminating point, which is set between the magnet and the salient pole that is adjacent to the other side of the magnet in the circumferential direction, is defined as a magnetic pole occupying angle $\theta 1$ of each of the magnets. An electrical angle corresponding to an angular range between the initiating point and the terminating point on two sides of each salient pole in the circumferential direction is defined as a magnetic pole occupying angle $\theta 2$ of each of the salient poles. The sum of the magnetic pole occupying angle $\theta 1$ and the magnetic pole occupying angle $\theta 2$ is 360°. The magnetic pole occupying angle $\theta 1$ is set in a range of $180° < \theta 1 \leq 200°$.

A fourth aspect of the present invention provides a motor including a rotor and a state. The rotor includes a rotor core, a plurality of magnets, and salient poles. The plurality of magnets are arranged along a circumferential direction of the rotor core to function as first magnetic poles. The salient poles are formed integrally with the rotor core and arranged between adjacent ones of the magnets in the circumferential direction to function as second magnetic poles. The stator is arranged facing toward the rotor and includes a plurality of slots. The magnets and salient poles each have a quantity in which the quantities sum together to a quantity x1 of magnetic pole portions of the rotor, and the slots are in a quantity x2. A ratio x1:x2 of the quantity of the magnetic pole portions to the quantity of the slots is 3n−1:3n (n being an odd number that is greater than or equal to 3) or 3n−2:3n (n being an even number that is greater than or equal to 4). An electrical angle corresponding to an angular range from an initiating point, which is set between each magnet and the salient pole that is adjacent to one side of the magnet in the circumferential direction, to a terminating point, which is set between the magnet and the salient pole that is adjacent to the other side of the magnet in the circumferential direction, is defined as a magnetic pole occupying angle θ1 of each of the magnets. An electrical angle corresponding to an angular range between the initiating point and the terminating point on two sides of each salient pole in the circumferential direction is defined as a magnetic pole occupying angle θ2 of each of the salient poles. The sum of the magnetic pole occupying angle θ1 and the magnetic pole occupying angle θ2 is 360°. The magnetic pole occupying angle θ1 is set in a range of 180°<θ1≤220°.

A fifth aspect of the present invention provides a motor including a rotor and a stator. The rotor includes a rotor core, a plurality of magnets, and salient poles. The plurality of magnets are arranged along a circumferential direction of the rotor core to function as first magnetic poles. The salient poles are formed integrally with the rotor core and arranged between adjacent ones of the magnets in the circumferential direction to function as second magnetic poles. A first clearance is formed between the magnet and the salient pole that are adjacent to each other in the circumferential direction. The stator is arranged facing toward the rotor spaced apart by a second clearance in a radial direction. The second clearance has a shortest radial distance A at locations corresponding to the magnets and a shortest radial distance B at locations corresponding to the salient poles. A ratio B/A is set in a range of 0.3≤B/A<1.

A sixth aspect of the present invention provides a rotor including a rotor core, a plurality of magnets, and a salient pole. The plurality of magnets are arranged along a circumferential direction of the rotor core to function as first magnetic poles. The salient pole is formed integrally with the rotor core and arranged between adjacent ones of the magnets in the circumferential direction to function as a second magnetic pole. A first clearance is formed between the magnets and the salient pole. At least part of a surface of the salient pole and at least part of surfaces of the magnets lie along a reference circumference. The surface of at least one of the salient pole and the magnets is gradually spaced apart from the reference circumference towards two circumferential ends of the surface so as to have a convex shape.

A seventh aspect of the present invention provides a rotor including a rotor core, a plurality of magnets, and salient poles. The plurality of magnets are arranged along a circumferential direction of the rotor core to function as first magnetic poles. The salient poles are formed integrally with the rotor core and arranged between adjacent ones of the magnets in the circumferential direction to function as second magnetic poles. A first clearance is formed between the magnet and the salient pole that are adjacent to each other in the circumferential direction. The salient poles relatively project outward in a radial direction from the magnets. Cover members covering the magnets are hooked to the rotor core between adjacent ones of the salient poles. The cover members are arranged so as not to project outward in the radial direction from the salient poles.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A first embodiment of the present invention will now be discussed with reference to FIGS. 1 to 3.

Figure 1:
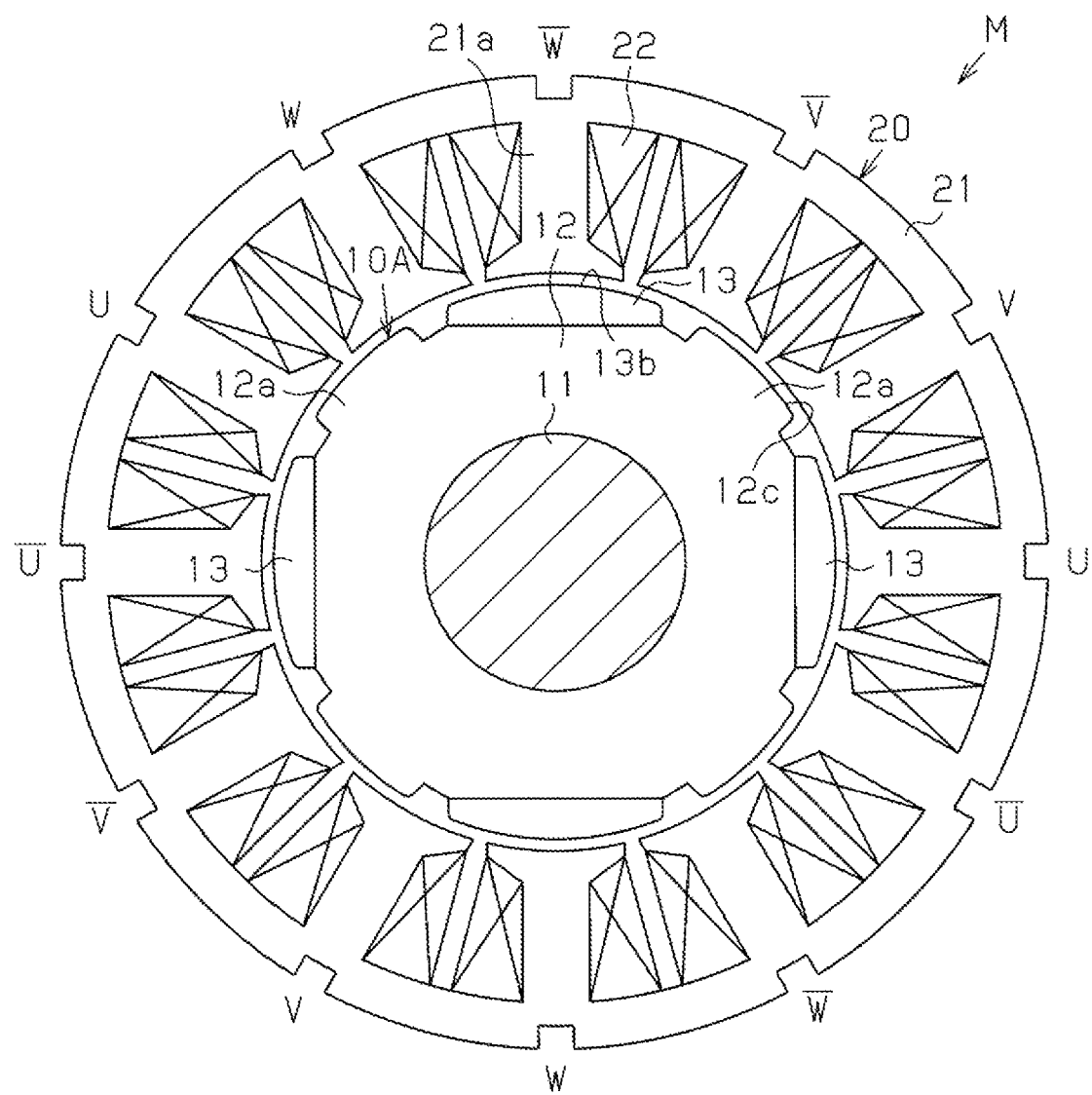
FIG. 1 is a plan view showing a motor according to a first embodiment of the present invention.
Figure 2:
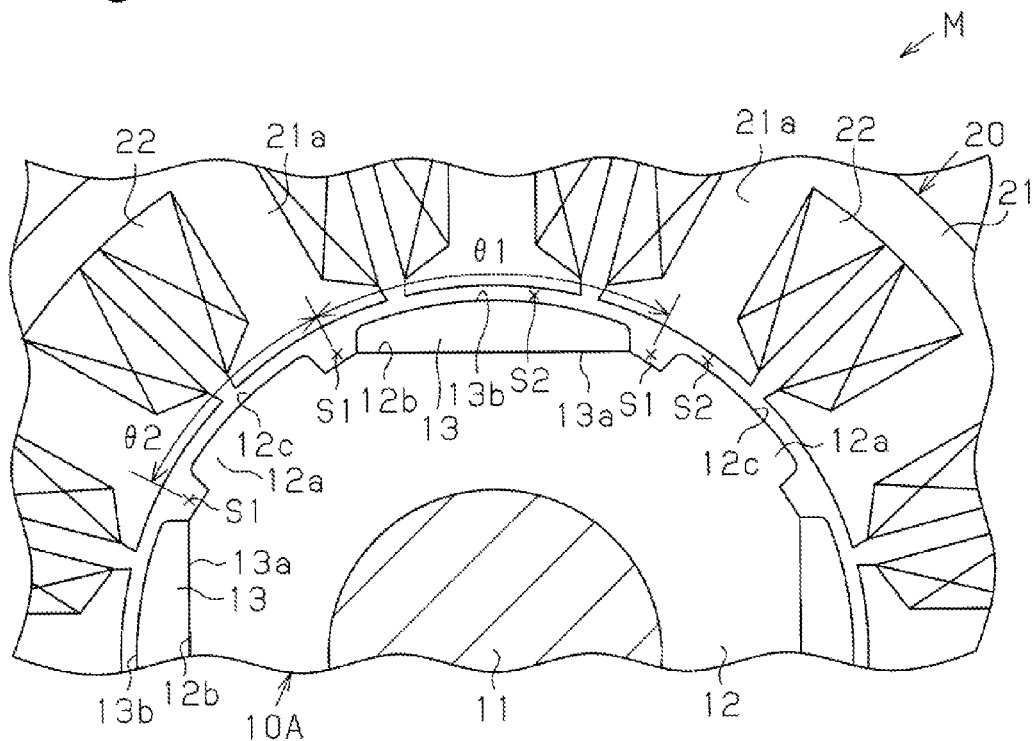
FIG. 2 is a partially enlarged view showing the motor of the first embodiment.

FIGS. 1 and 2 show an inner rotor type brushless motor M. The motor M of the first embodiment uses a rotor 10A including a substantially annular rotor core 12, which is formed from a magnetic metal material and fixed to an outer circumferential surface of a rotation shaft 11, four N-pole magnets 13, which are arranged along the circumferential direction of the rotor core 12, and salient poles 12a, which are formed integrally with the rotor core 12 and arranged between adjacent ones of the magnets 13 in the circumferential direction. The salient poles 12a function as S-poles. In other words, the rotor 10A is a so-called consequent pole type having eight magnetic pole portions. A stator 20 includes a stator core 21, which has twelve teeth 21a, and coils 22, which are wound around the teeth 21a. Slots for accommodating the coils 22 are formed between the teeth 21a that are adjacent to each other in the circumferential direction. The stator 20 includes twelve magnetic pole portions. That is, in the brushless motor M of the first embodiment, the magnetic pole portion quantity X1 of the rotor 10A and the slot quantity X2 (number of teeth) of the stator 20 are set at a ratio X1:X2 of 8:12, that is, 2n:3n ("n" is four).

The coils 22 includes coils of three phases, namely, the U, V, and W phases, which are arranged counterclockwise in the order of a W phase (forward winding), W bar phase (reverse winding), V bar phase, V phase, U phase, U bar phase, W bar phase, W phase, V phase, V bar phase, U bar phase, and U phase in the clockwise direction. In other words, the coils 22 are arranged so that a forward winding and reverse winding are arranged next to each other for each coil of the same phase. The magnets 13 and the salient poles 12a are alternately arranged in equal angular intervals on the peripheral portion of the rotor 10A.

The magnet 13 has a circumferential length that is slightly longer than that of the salient pole 12a. Further, the magnet 13 is substantially box-shaped and has a flat inner surface 13a and a curved outer surface 13b. The inner surface 13a of the magnet 13 is fixed to a flat fixation surface 12b arranged between adjacent ones of the salient poles 12a on the rotor core 12. A clearance (gap in the circumferential direction) S1 is formed between a magnet 13 and salient pole 12a that are adjacent to each other in the circumferential direction.

The salient pole 12a has a circumferential length that is slightly shorter than that of the magnet 13. Further, the salient pole 12a projects outward from the peripheral portion of the rotor core 12 and has an arcuate shape. The salient pole 12a has a curved outer surface 12c that lies along the same circumference as the outer surface 13b of the magnet 13. Thus, a clearance S2 between the outer surface 12c of the salient pole 12a and the stator 20 (distal surface of the teeth 21a) is the same as the clearance S2 between the outer surface 13b of the magnet 13 and the stator 20 (distal surface of the teeth 21a).

In FIG. 2, each magnet 13 has a circumferential length shown as a magnetic pole occupying angle θ1, and each salient pole 12a has a circumferential length shown as a magnetic pole occupying angle θ2. Each of the magnetic pole occupying angles θ1 and θ2 is an angular range, the initiating point and terminating point of which are the median point of the clearance S1 between the magnet 13 and the salient pole 12a. In other words, the magnetic pole occupying angle θ1 of each magnet 13 is defined as the angular range from the median point (initiating point) of the clearance S1 on one circumferential side of the magnet 13 to the median point (terminating point) of the clearance S1 on the other circumferential side of the magnet 13. The magnetic pole occupying angle θ2 of each salient pole 12a is defined as the angular range from the median point (initiating point) of the clearance S1 on one circumferential side of the salient pole 12a to the median point (terminating point) of the clearance S1 on the other circumferential side of the salient pole 12a. FIG. 3 shows the torque ripple and the torque of the motor when changing the magnetic pole occupying angles θ1 and θ2. In FIG. 3, the torque ripple is shown by the solid line, and the torque is shown by a single-dash line. In FIG. 3, the magnetic pole occupying angles θ1 and θ2 are shown as electrical angles. In the description hereafter, the magnetic pole occupying angles θ1 and θ2 will be described as electrical angles unless otherwise mentioned. The sum of the magnetic pole occupying angle θ1 of a single magnet 13 and the magnetic pole occupying angel θ2 of a single salient pole 12a is electrical angle 360° (θ1+θ2=360°). Thus, only the magnetic pole occupying angle θ1 of the magnet 13 will be described below.

Figure 3:
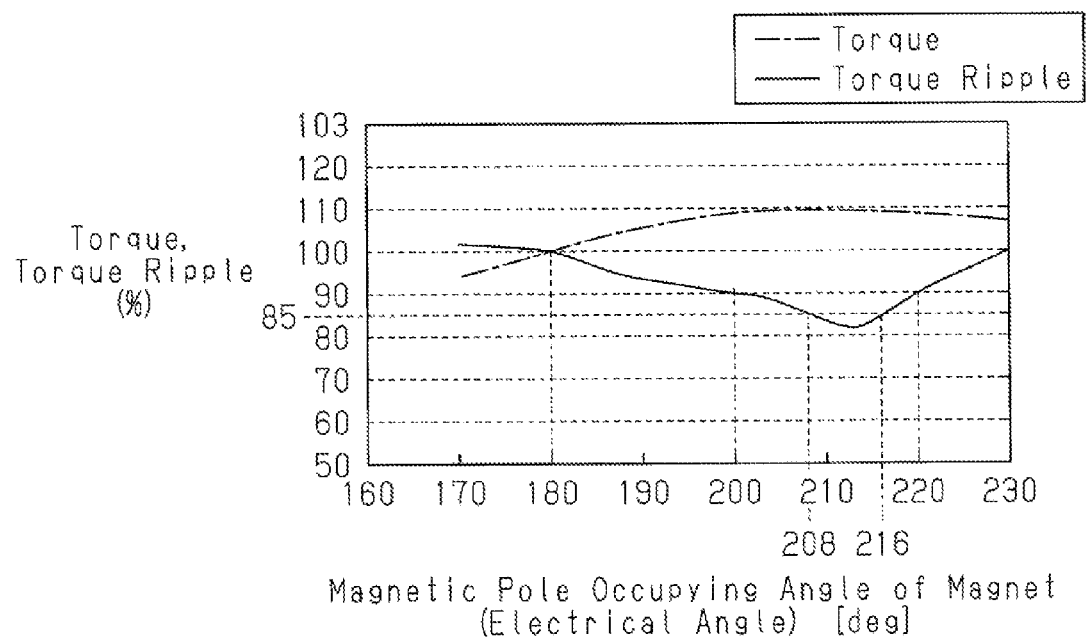
FIG. 3 is a graph showing the relationship of a magnetic pole occupying angle and torque ripple and the relationship of the magnetic pole occupying angle and torque in the first embodiment.

In FIG. 3, the magnitude of the torque is defined as 100% when the magnetic pole occupying angle θ1 of the magnet 13 is 180°, that is, when the magnetic pole occupying angle θ1 of the magnet 13 and the magnetic pole occupying angle θ2 of the salient pole 12a are equal to each other. The magnitude of the torque when the magnetic pole occupying angle θ1 differs from 180° is indicated as a ratio in relation with the magnitude of the torque when the magnetic pole occupying angle θ1 is 180°. The torque becomes less than 100% when the magnetic pole occupying angle θ1 is less than 180°. The torque exceeds 100% when the magnetic pole occupying angle θ1 is in the range of 180° and 230°.

In FIG. 3, the magnitude of the torque ripple is defined as 100% when the magnetic pole occupying angle θ1 of the magnet 13 is 180°, and the magnitude of the torque ripple when the magnetic pole occupying angle θ1 differs from 180° is indicated as a ratio in relation with the magnitude of the torque ripple when the magnetic pole occupying angle θ1 is 180°. The torque ripple becomes greater than 100% when the magnetic pole occupying angle θ1 is less than 180°. When the magnetic pole occupying angle θ1 is increased to greater than 180°, the torque ripple is reduced to 90% at the magnetic pole occupying angle θ1 of 200°. When the magnetic pole occupying angle θ1 is further increased, the torque ripple is reduced to 85% at the magnetic pole occupying angle θ1 of 208°. When the magnetic pole occupying angle θ1 is approximately 213°, the torque ripple is reduced to a minimum value of about θ2%. After the magnetic pole occupying angle θ1 becomes greater than approximately 213°, the torque ripple increases as the magnetic pole occupying angle θ1 increases. The torque ripple becomes 85% at the magnetic pole occupying angle θ1 of 216°, 90% at the magnetic pole occupying angle θ1 of 220°, and greater than or equal to 100% when the magnetic pole occupying angle θ1 exceeds 230°. That is, compared to a structure in which the magnetic pole occupying angles θ1 and θ2 are equal to each other, the torque ripple is reduced when the magnetic pole occupying angle θ1 of the magnet 13 is in the range of 180°<θ1≤230°. The torque ripple is reduced to 90% in the range of 200°≤θ1≤220°. Further, the torque ripple is reduced to 85% in the range of 208°≤θ1≤216°.

Accordingly, in the range of 180°<θ1≤230°, the magnetic pole occupying angle θ1 is set in the range of 208°≤θ1≤216° for the rotor 10A of the first embodiment. Thus, compared to a structure in which the magnetic pole occupying angles θ1 and θ2 are equal to each other, the torque ripple is reduced while suppressing torque decrease. Consequently, the rotation performance of the rotor 10A is improved.

The first embodiment has the advantages described below.

(1) In the first embodiment, the magnetic pole occupying angle θ1 of the magnet 13 is set in the range of 180°<θ1≤230° in the motor M of which the ratio X1:X2 of the magnetic pole portion quantity X1 of the rotor 10A and the slot quantity X2 of the stator 20 is 2n:3n (n is a natural number). Thus, compared to a typical motor in which the magnetic pole occupying angle θ1 of the magnet 13 and the magnetic pole occupying angle θ2 of the salient pole 12a are the same, the motor M of the first embodiment reduces torque ripple while suppressing torque decrease (see FIG. 3). This improves the rotation performance of the rotor 10A.

(2) In the first embodiment, the magnetic pole occupying angle θ1 of the magnet 13 is set in a range of 200°≤θ1≤220°. Thus, compared to a structure in which the magnetic pole occupying angle θ1 of the magnet 13 and the magnetic pole occupying angle θ2 of the salient pole 12a are the same, the motor M of the first embodiment reduces torque ripple to about 90% (see FIG. 3). This further improves the rotation performance of the rotor 10A.

(3) In the first embodiment, the magnetic pole occupying angle θ1 of the magnet 13 is set the range of 208° θ1≤216°. Thus, compared to a structure in which the magnetic pole occupying angle θ1 of the magnet 13 and the magnetic pole occupying angle θ2 of the salient pole 12a are the same, the motor M of the first embodiment reduces torque ripple to about 85% (see FIG. 3). This further improves the rotation performance of the rotor 10A.

(4) In the first embodiment, the clearance S1 is formed between the magnet 13 and the salient pole 12a that are adjacent to each other in the circumferential direction of the rotor 10A. The magnetic pole occupying angles θ1 and θ2 are each set using the median point in the circumferential direction of the clearance S1 as an initiating point and a terminating point. Thus, the clearance S1 suppresses sudden changes in the magnetic flux density at the boundary of an adjacent magnet 13 and salient pole 12a. Further, torque ripple is reduced while suppressing torque decrease in the motor M that includes the rotor 10A.

The first embodiment may be modified as described below.

In the first embodiment, the magnetic pole occupying angle θ1 of the magnet 13 is set in the range of 208°≤θ1≤216°. However, the magnetic pole occupying angle θ1 may be set in a wider range of 200°≤θ1≤220° or in an even wider range of 180°<θ1≤230°.

In the first embodiment, the ratio X1:X2 of the magnetic pole portion quantity X1 of the rotor 10A and the slot quantity X2 of the stator 20 is set to 8:12, that is, 2n:3n ("n" is 4). The value of "n" may be changed to other natural numbers.

The numerical ranges in the first embodiment may be changed as required in accordance with the situation or the like.

Second Embodiment

A second embodiment of the present invention will now be discussed with reference to FIGS. 4 to 8.

In the second embodiment, the quantity of magnetic pole portions in the rotor differs from the first embodiment. Accordingly, the same reference numerals are given to those components that are the same as the corresponding components of the first embodiment. Such components will not be described in detail.

Figure 4:
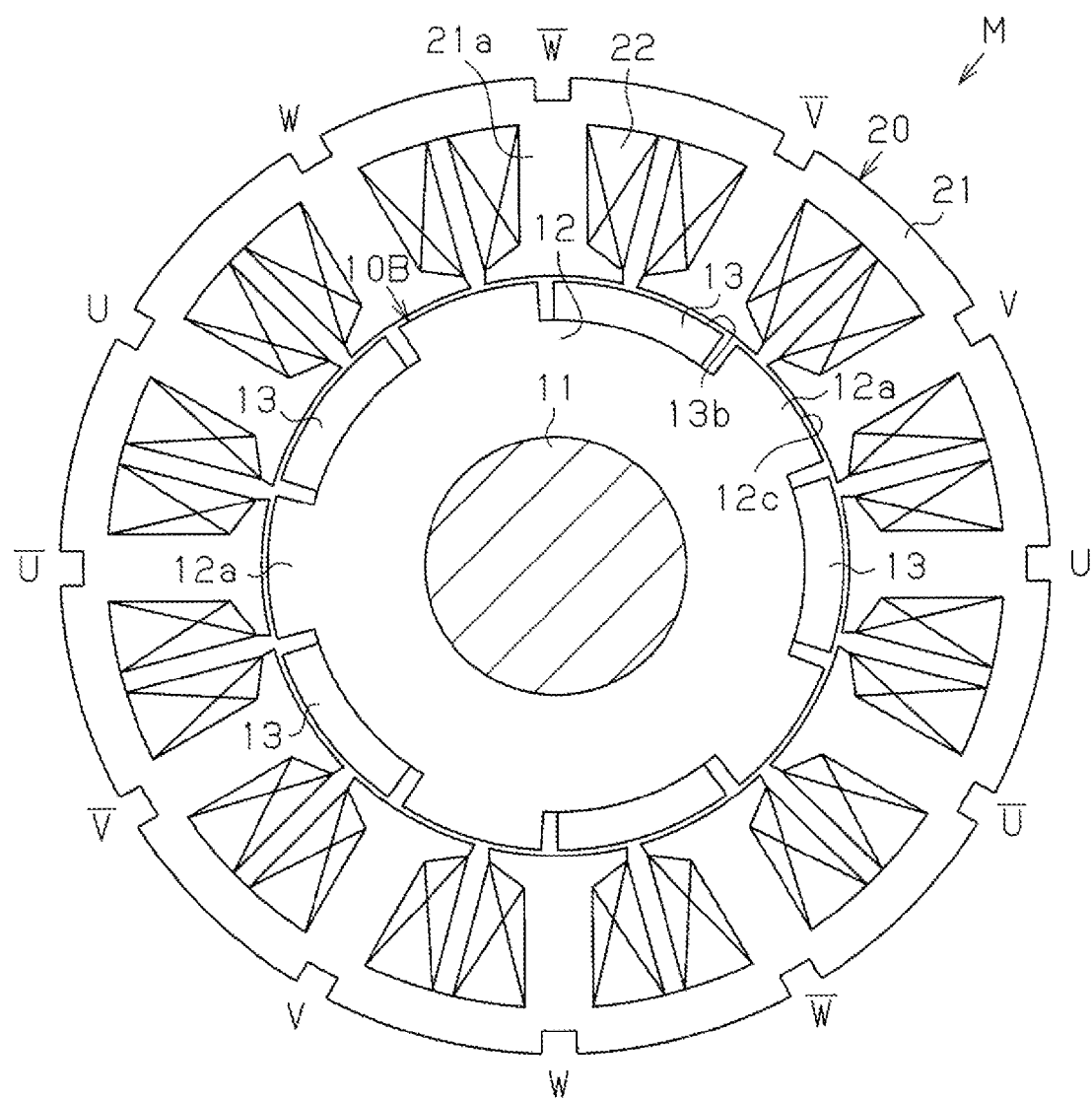
FIG. 4 is a plan view showing a motor according to a second embodiment of the present invention.
Figure 5:
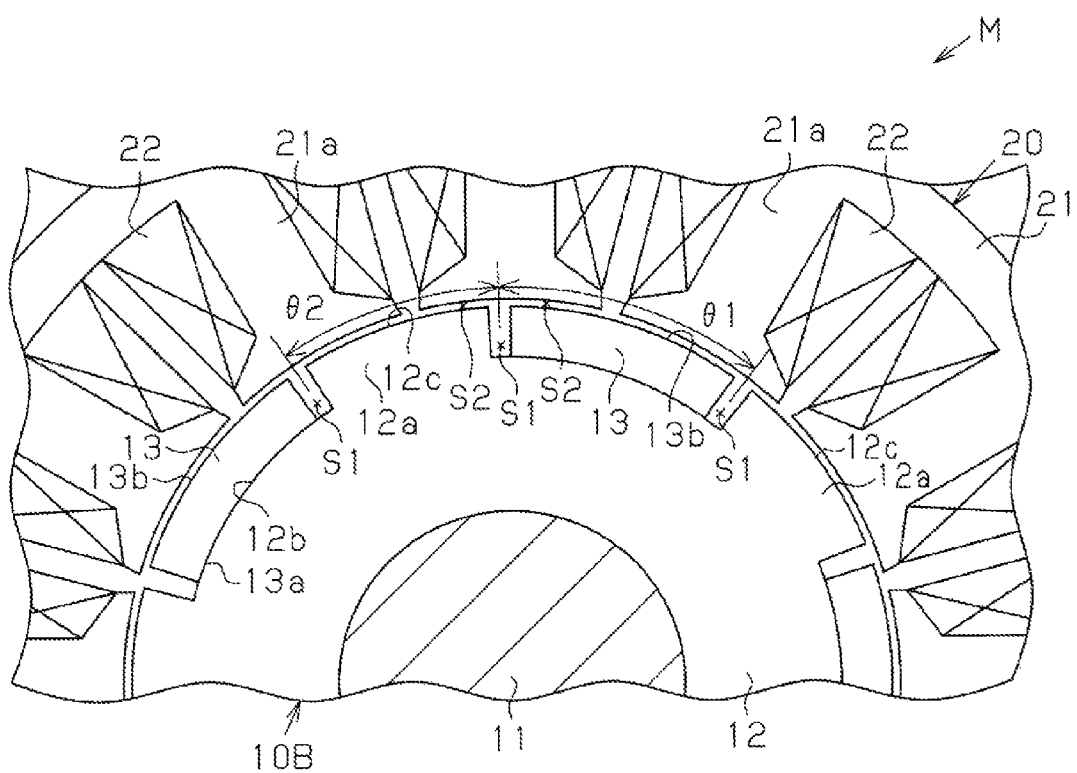
FIG. 5 is a partially enlarged view showing the motor of the second embodiment.

As shown in FIGS. 4 and 5, the motor M of the second embodiment uses a rotor 10B includes five N-pole magnets 13, which are arranged along the circumferential direction of the rotor core 12, and five salient poles 12a, arranged between adjacent ones of the magnets 13 in the circumferential direction. The salient poles 12a function as the S-poles. In other words, the rotor 10B is a so-called consequent pole type having ten magnetic pole portions. The stator 20 includes twelve teeth 21a in the same manner as in the first embodiment. That is, the ratio X1:X2 of the magnetic pole portion quantity X1 of the rotor 10B and the slot quantity X2 (number of teeth) of the stator 20 is set to 10:12, that is, 3n−2:3n ("n" is 4) in the brushless motor M of the second embodiment.

The magnet 13 has a circumferential length that is slightly longer than that of the salient pole 12a. The magnet 13 has a curved shape and a thickness (dimension in the radial direction) of which is constant in the circumferential direction. Accordingly, the inner surface 13a and the outer surface 13b of the magnet 13 are parallel. The fixation surface 12b of the rotor core 12, to which the inner surface 13a of the magnet 13 is fixed, has a curved shape conforming to the inner surface 13a. The clearance (gap in the circumferential direction) S1 is formed between a magnet 13 and salient pole 12a that are adjacent to each other in the circumferential direction. The clearance S1 is set to have a dimension that is about one to two times greater than the clearance S2 between the rotor 10B and the stator 20 (clearance S2 between the outer surface of the salient pole 12a or magnet 13 and the distal surface of the teeth 21a).

Figure 6A:
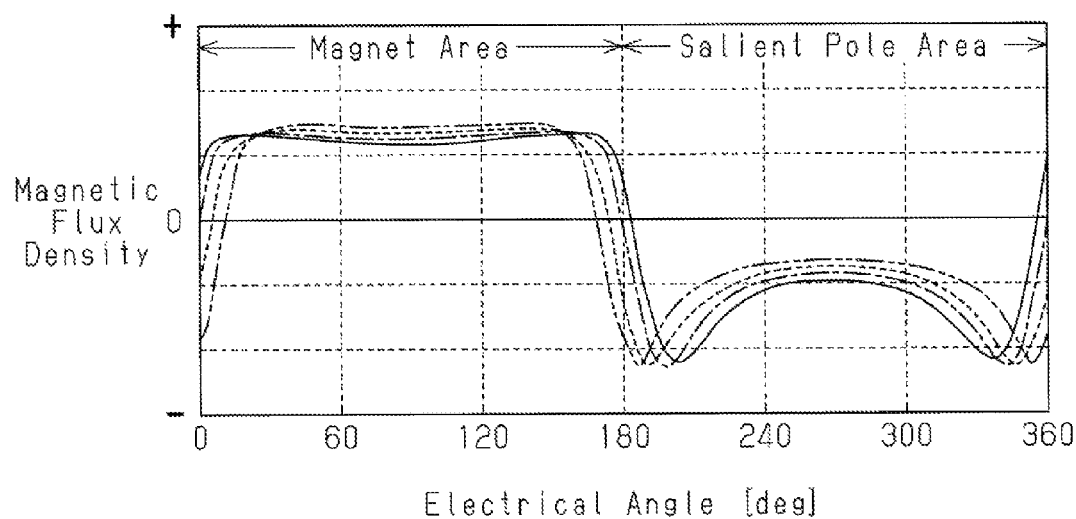
FIG. 6A is a graph showing magnetic flux density variation in the motor of the second embodiment.
Figure 6B:
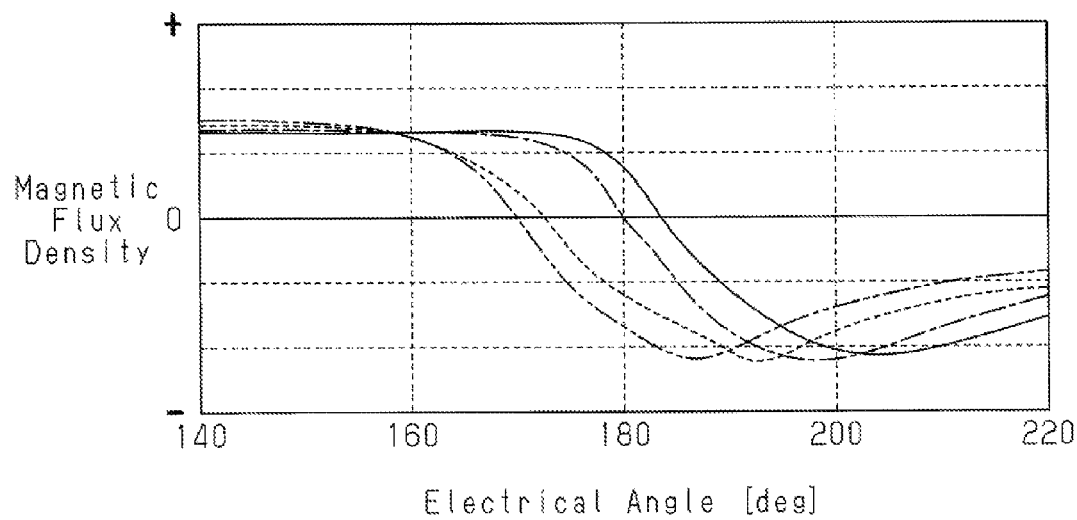
FIG. 6B is an enlarged graph showing magnetic flux density variation near an electrical angle of 180° in the second embodiment.
Figure 6B:
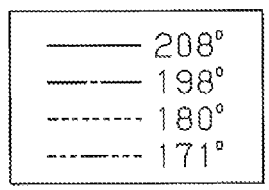
Figure 7:
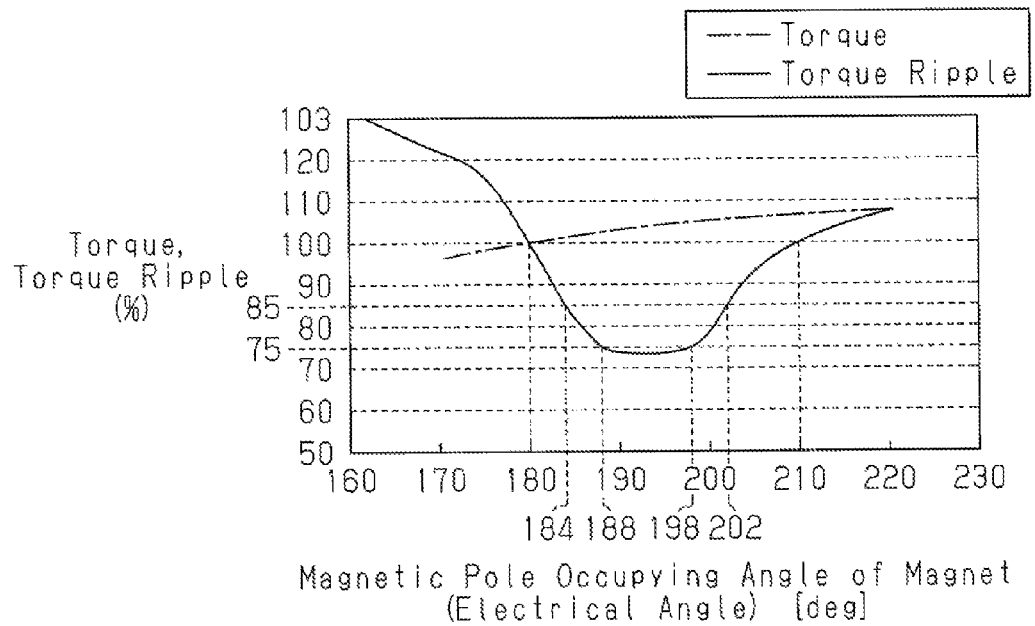
FIG. 7 is a graph showing the relationship of a magnetic pole occupying angle and torque ripple ratio and the relationship of the magnetic pole occupying angle and torque ratio in the second embodiment.

FIGS. 6A and 6B show the surface magnetic flux density variation of the rotor 10B when the magnetic pole occupying angles θ1 and θ2 of the magnet 13 and the salient pole 12a are changed. FIG. 7 shows torque ripple and the torque. In FIG. 7, the torque ripple is shown by a solid line, and the torque is shown by a single-dash line.

FIGS. 6A and 6B show the magnetic flux density variation of the rotor 10B when the magnetic pole occupying angle θ1 of the magnet 13 is changed to 171°, 180°, 198°, and 208° (189°, 180°, 162°, 152° in order for the magnetic pole occupying angle θ2). For all of these magnetic pole occupying angles θ1, the magnetic flux density varies in a similar manner. Specifically, the curve indicating the magnetic flux density variation has a substantially trapezoidal shape in the magnetic pole zone of the magnet 13 and a convex shape in the magnetic pole zone of the salient pole 12a in which the area near the middle of the magnetic pole drops more than the area near the ends of the magnetic pole.

When the magnetic pole occupying angle θ1 of the magnet 13 is set to 180°, that is, when the magnetic pole occupying angle θ1 of the magnet 13 and the magnetic pole occupying angle θ2 of the salient pole 12a are equal to each other, the magnetic flux density does not become zero at the electrical angles 0°, 180°, 360° (=0°) in the rotor 10B, which has a magnetically unbalanced structure. Specifically, when the magnetic pole occupying angle θ1 of the magnet 13 is 180°, the magnetic flux density rises so as to pass by zero at an electrical angle that is slightly larger than 0° and falls so as to pass by zero at an electrical angle that is slightly smaller than 180°. That is, the range of the magnetic pole of the magnet 13 appears as a range that is smaller than the range of the magnetic pole of the salient pole 12a in the circumferential direction.

When the magnetic pole occupying angle θ1 of the magnet 13 is 171°, which is smaller than 180°, the point at which the magnetic flux density becomes zero is more spaced apart from the electrical angles 0° and 180° than when the magnetic pole occupying angle θ1 is 180°. Accordingly, the range of the magnetic pole of the magnet 13 appears as a range that is further smaller than the range of the magnetic pole of the salient pole 12a in the circumferential direction. The drop in the magnetic flux density near the middle of the magnetic pole zone of the salient pole 12a also becomes larger.

When the magnetic pole occupying angle θ1 of the magnet 13 is 198°, which is larger than 180°, the magnetic flux density becomes zero at the electrical angles 0° and 180°. That is, the range of the magnetic pole of the magnet 13 appears as a range equal to the range of the magnetic pole of the salient pole 12a in the circumferential direction. The drop in the magnetic flux density near the middle of the magnetic pole zone of the salient pole 12a becomes small.

When the magnetic pole occupying angle θ1 of the magnet 13 is 208° and further larger, the magnetic flux density rises so as to pass by zero at an electrical angle that is slightly smaller than 0° and falls so as to pass by zero at an electrical angle that is slightly larger than 180°. That is, the range of the magnetic pole of the magnet 13 appears as a range that is larger than the range of the magnetic pole of the salient pole 12a in the circumferential direction. The drop near the middle of the magnetic pole zone of the salient pole 12a of the magnetic flux density becomes smaller.

FIG. 7 shows the torque ripple and the torque when changing the magnetic pole occupying angle θ1 of the magnet 13. If the magnitude of torque is 100% when the magnetic pole occupying angle θ1 of the magnet 13 is 180°, the torque is less than 100% when the magnetic pole occupying angle θ1 is smaller than 180°. The torque exceeds 100% in the range in which the magnetic pole occupying angle θ1 is between 180° and 220°.

In FIG. 7, if the magnitude of the torque ripple is 100% when the magnetic pole occupying angle θ1 of the magnet 13 is 180°, the torque ripple is greater than 100% when the magnetic pole occupying angle θ1 is smaller than 180°. When the magnetic pole occupying angle θ1 is increased to be larger than 180°, the torque ripple is reduced to 85% at the magnetic pole occupying angle θ1 of 184°. When the magnetic pole occupying angle θ1 is further increased, the torque ripple is reduced to 75% at the magnetic pole occupying angle θ1 of 188°. The torque ripple is reduced to a minimum value of about 73% when the magnetic pole occupying angle θ1 is approximately 190° to 195°. After the magnetic pole occupying angle θ1 becomes greater than approximately 195°, the torque ripple increases as the magnetic pole occupying angle θ1 increases and becomes 75% at the magnetic pole occupying angle θ1 of 1980, 85% at the magnetic pole occupying angle θ1 of 202°, and greater than or equal to 100% just about when the magnetic pole occupying angle θ1 exceeds 210°. That is, compared to a structure in which the magnetic pole occupying angle θ1 and the magnetic pole occupying angle θ2 are equal to each other, the range of 180°<θ1≤210° is a satisfactory range that reduces the torque ripple. The range of 184°≤θ1≤202° is a satisfactory range where the torque ripple can be reduced to 85%. The range of 188°≤θ1≤198° is a further satisfactory range that reduces the torque ripple to 75%.

Accordingly, in the range of 180°<θ1<210°, the magnetic pole occupying angle θ1 is set in the range of 188°≤θ1≤1980 in the rotor 10B of the second embodiment. Thus, compared to a structure in which the magnetic pole occupying angles θ1 and θ2 are equal to each other, the torque ripple is reduced while suppressing torque decrease. As a result, the rotation performance of the rotor 10B is improved.

The second embodiment has the advantages described below.

(5) In the second embodiment, the magnetic pole occupying angle θ1 of the magnet 13 is set in the range of 180°<θ1≤210° in the motor M of which the ratio X1:X2 of the magnetic pole portion quantity X1 of the rotor 10B and the slot quantity X2 of the stator X2 is 3n–2:3n (n is an even number that is greater than or equal to 4). Thus, compared to a structure in which the magnetic pole occupying angle θ1 of the magnet 13 and the magnetic pole occupying angle θ2 of the salient pole 12a are the same, the motor M of the second embodiment reduces the torque ripple while suppressing torque decrease (see FIG. 7) and improves the rotation performance of the rotor 10B.

(6) In the second embodiment, the magnetic pole occupying angle θ1 of the magnet 13 is set in the range of 184°≤θ1≤202°. Thus, compared to a structure in which the magnetic pole occupying angle θ1 of the magnet 13 and the magnetic pole occupying angle θ2 of the salient pole 12a are the same, the motor M of the second embodiment reduces the torque ripple to about 85% (see FIG. 7). This further improves the rotation performance of the rotor 10B.

(7) In the second embodiment, the magnetic pole occupying angle θ1 of the magnet 13 is set in the range of 188°θ1≤198°. Thus, compared to a structure in which the magnetic pole occupying angle θ1 of the magnet 13 and the magnetic pole occupying angle θ2 of the salient pole 12a are the same, the motor M of the second embodiment reduces the torque ripple to about 75% (see FIG. 7). This further improves the rotation performance of the rotor 10B.

(8) In the second embodiment, the clearance S1 is formed between a magnet 13 and salient pole 12a that are adjacent to each other in the circumferential direction of the rotor 10B. Accordingly, advantage (4) of the first embodiment is also obtained.

Figure 8:
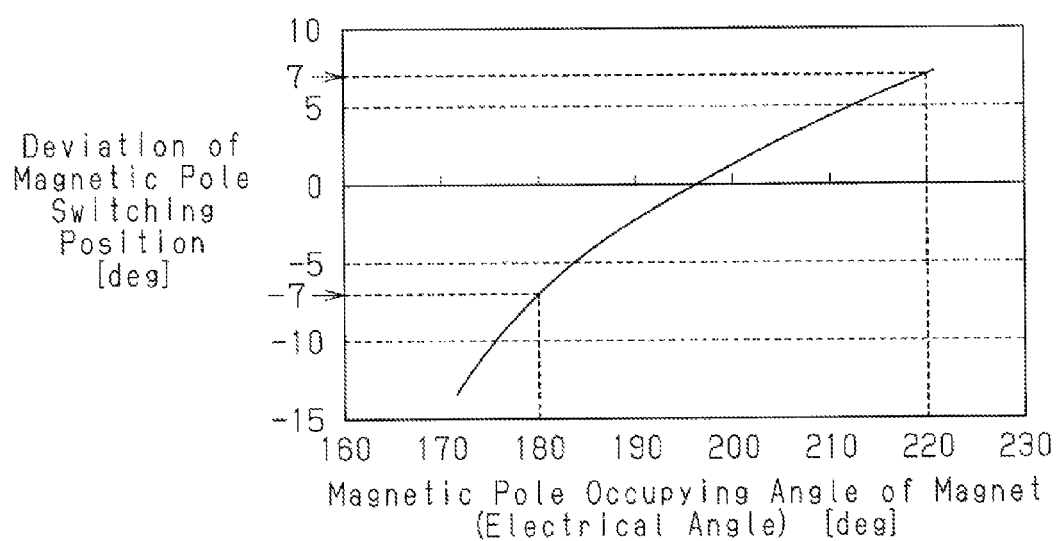
FIG. 8 is a diagram showing the relationship of the magnetic pole occupying angle and magnetic pole switching position in the second embodiment.

(9) In the second embodiment, the relationship of the magnetic pole occupying angles (electrical angles) θ1 and θ2 and the deviation of the magnetic pole switching position is shown in FIG. 8. FIG. 8 shows the relationship of the magnetic pole occupying angle θ1 of the magnet 13 and the deviation of the magnetic pole switching position. As described above, the deviation of the magnetic pole switching position becomes 0° at θ1=198° at which the size of the magnetic pole range of the magnet 13 and the size of the magnetic pole range of the salient pole 12a that actually appear on the surface of the rotor 10B become equal to each other. When the magnetic pole occupying angle θ of the magnet 13 becomes smaller than 198°, the deviation of the magnetic pole switching position gradually increases in the negative side. This indicates that the magnetic pole range of the magnet 13 that actually appears on the surface of the rotor 10B is small in the circumferential direction. When the magnetic pole occupying angle θ of the magnet 13 increases from 198°, the deviation in the magnetic pole switching position gradually increases in the positive side. This indicates that the magnetic pole range of the magnet 13 that actually appears on the surface of the rotor 10B is large in the circumferential direction.

Further, when the magnetic pole occupying angles θ1 and θ2 of the magnet 13 and the salient pole 12a are the same, the deviation of the magnetic pole switching position of the magnet 13 that actually appears on the surface of the rotor 10B is −7°. Thus, the deviation of the magnetic pole switching position is less than ±7° when the magnetic pole occupying angle θ1 of the magnet 13 is in the range of 180°<θ1<220°. This range is a satisfactory range since the magnitude of the magnetic pole range of the magnet 13 and the magnitude of the magnetic pole range of the salient pole 12a that actually appear on the surface of the rotor 10B become equal or substantially equal in the circumferential direction.

Compared to a structure in which the magnetic pole occupying angle θ1 of the magnet 13 and the magnetic pole occupying angle θ2 of the salient pole 12a are the same, the above-described setting for the magnetic pole occupying angle θ1 magnetically balances the motor M and improves the rotation performance of the rotor 10B.

The second embodiment may be modified as described below.

In the second embodiment, the magnetic pole occupying angle θ1 of the magnet 13 is set in the range of 188°≤θ1≤198° but may be set in a wider range of 184°≤θ1≤202° or an even wider range of 180°<θ1≤210°.

In the second embodiment, the ratio X1:X2 of the magnetic pole portion quantity X1 of the rotor 10B and the slot quantity X2 of the stator 20 is set to 10:12, that is, 3n−2:3n ("n" is 4). However, the value of "n" may be changed when required to another even number that is greater than or equal to 4. The ratio X1:X2 for the magnetic pole portion quantity X1 of the rotor 10B and the slot quantity X2 of the stator 20 may be set to 3n−1:3n ("n" is an odd number greater than or equal to 3), for example, a ratio X1:X2 of 8:9 or 11:12.

The numerical ranges in the second embodiment may be changed as required in accordance with the situation or the like.

Third Embodiment

A third embodiment of the present invention will now be discussed with reference to FIGS. 9 to 11.

In the third embodiment, the quantity of magnetic pole portions of the rotor differs from the first embodiment. Accordingly, the same reference numerals are given to those components that are the same as the corresponding components of the first embodiment. Such components will not be described in detail.

Figure 9:
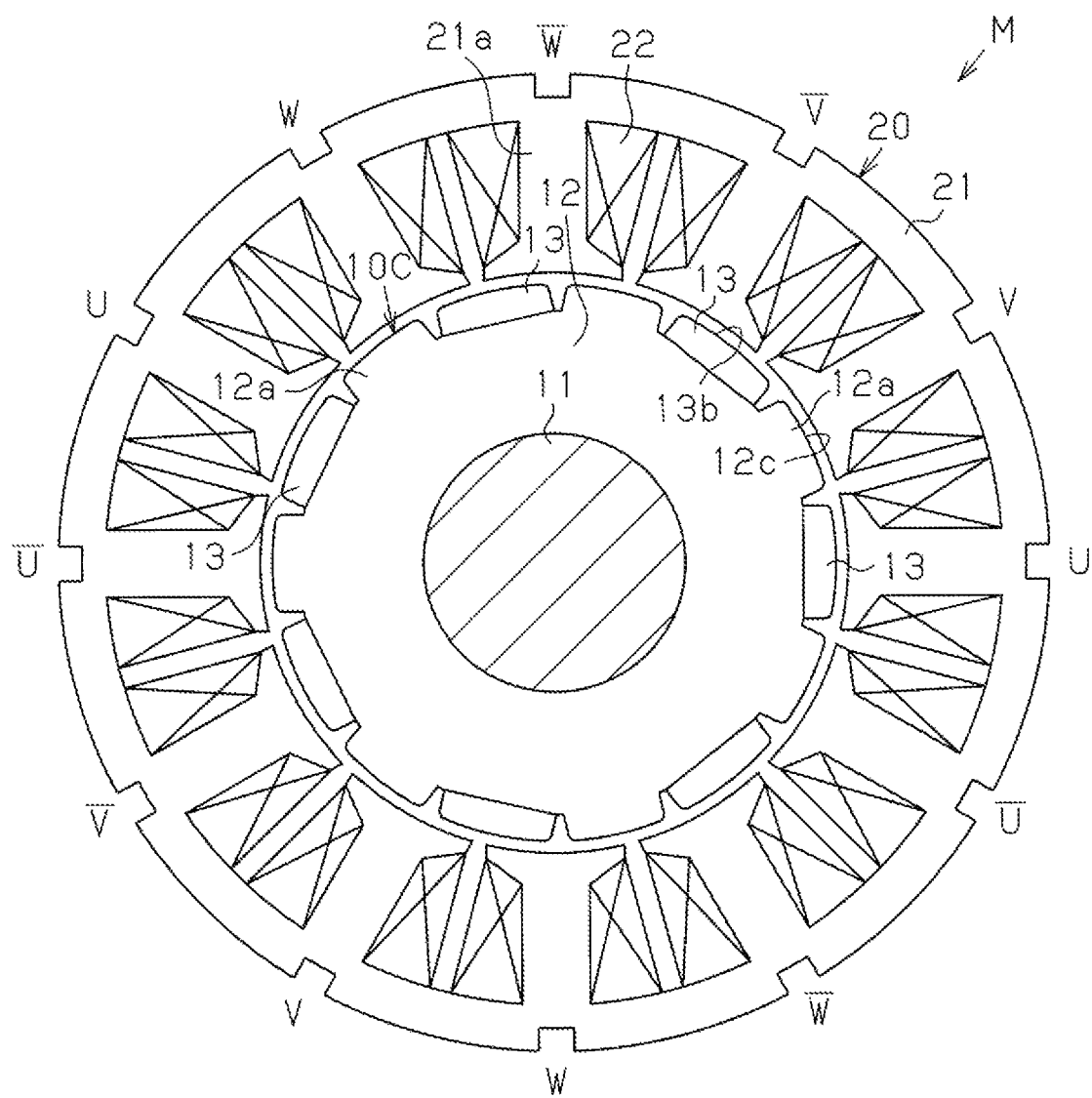
FIG. 9 is a plan view showing a motor according to a third embodiment of the present invention.
Figure 10:
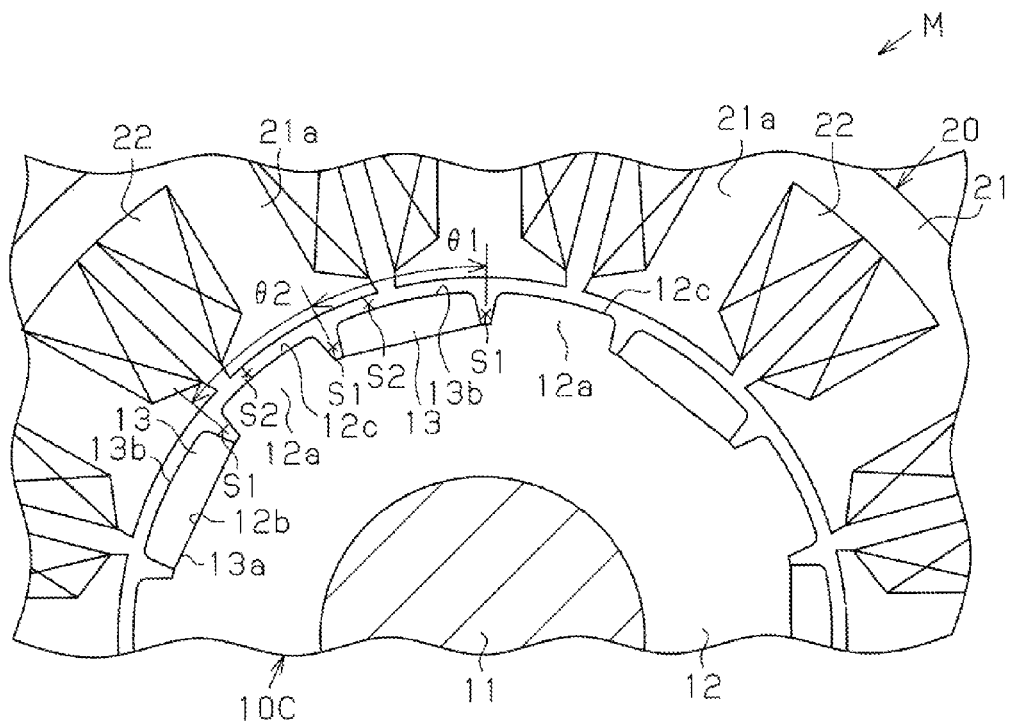
FIG. 10 is a partially enlarged view showing the motor of the third embodiment.

As shown in FIGS. 9 and 10, the motor M of the third embodiment uses a rotor 10C including seven N-pole magnets 13, which are arranged along the circumferential direction of the rotor core 12, and seven salient poles 12a, which are arranged between adjacent ones of the magnets 13 in the circumferential direction. The salient poles 12a function as the S-poles. In other words, the rotor 10C is a so-called consequent pole type having fourteen magnetic pole portions. The stator 20 includes twelve teeth 21a in the same manner as the first embodiment. That is, in the brushless motor M of the third embodiment, the ratio X1:X2 of the magnetic pole portion quantity X1 of the rotor 10C and the slot quantity X2 (number of teeth) of the stator 20 is set to 14:12, that is, 3n+2:3n ("n" is 4).

Figure 11:
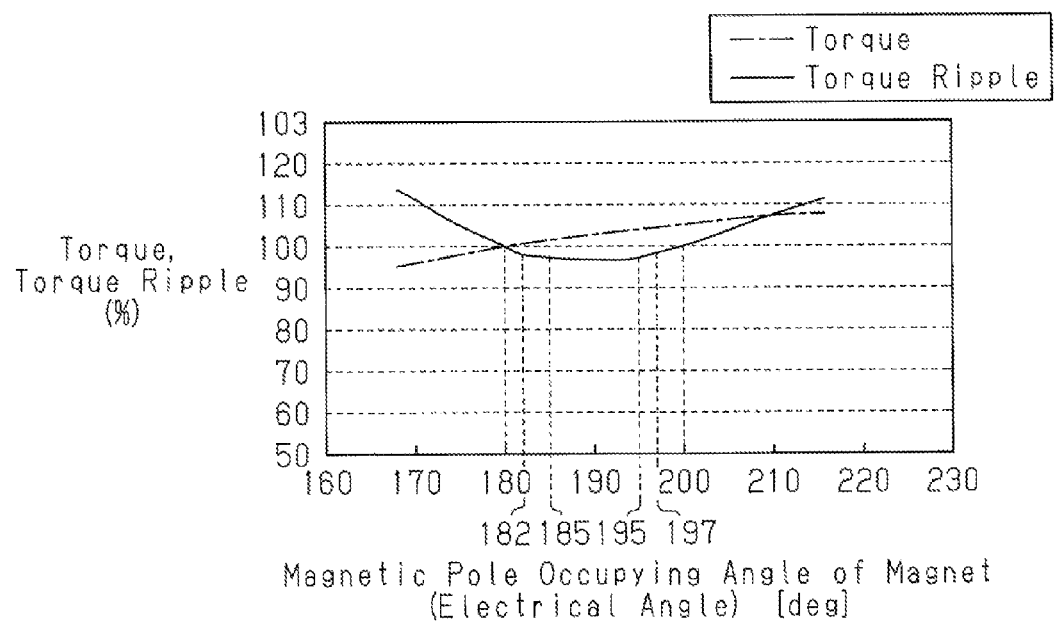
FIG. 11 is a graph showing the relationship of a magnetic pole occupying angle and torque ripple ratio and the relationship of the magnetic pole occupying angle and torque ratio in the third embodiment.

FIG. 11 shows the torque ripple and the torque when changing the circumferential lengths of the magnet 13 and the salient pole 12a, that is, when changing the magnetic pole occupying angles (electrical angles) θ1 and θ2, the initiating points and terminating points of which are the median points of the clearances S1 between the magnets 13 and the salient poles 12a. In FIG. 11, the torque ripple is shown by a solid line, and the torque is shown by a single-dashed line.

In FIG. 11, the magnitude of torque is defined as 100% when the magnetic pole occupying angle θ1 of the magnet 13 is 180°, that is, when the magnetic pole occupying angle θ1 of the magnet 13 and the magnetic pole occupying angle θ2 of the salient pole 12a are equal to each other. The torque becomes less than 100% when the magnetic pole occupying angle θ1 is smaller than 180°. The torque exceeds 100% when the magnetic pole occupying angle θ1 is in the range of 180° to 210°.

In FIG. 11, the magnitude of the torque ripple is defined as 100% when the magnetic pole occupying angle θ1 of the magnet 13 is 180°. The torque ripple becomes greater than 100% when the magnetic pole occupying angle θ1 is smaller than 180°. When the magnetic pole occupying angle θ1 is increased to be larger than 180°, the torque ripple is reduced to 98% at the magnetic pole occupying angle θ1 of 182°. The torque ripple is reduced to about 96% (near minimum value) when the magnetic pole occupying angle θ1 is about 185° to 195°. After the magnetic pole occupying angle θ1 exceeds 195°, the torque ripple increases as the magnetic pole occupying angle θ1 increases and becomes 98% when the magnetic pole occupying angle θ1 is approximately 197°. The torque ripple becomes greater than or equal to 100% just about when the magnetic pole occupying angle θ1 exceeds 200°. That is, compared to a structure in which the magnetic pole occupying angles θ1 and θ2 are equal to each other, the torque ripple is reduced when the magnetic pole occupying angle θ1 of the magnet 13 is in the range of 180°<θ1≤200°, the torque ripple is reduced to 98% in the range of 182°≤θ1≤197°, and the torque ripple is reduced to about 96% in the range of 185°≤θ1≤195°.

Accordingly, in the range of 180°<θ1≤200°, the magnetic pole occupying angle θ1 is set in the range of 185°≤θ1≤195° in the rotor 10C of the third embodiment. Thus, compared to a structure in which the magnetic pole occupying angles θ1 and θ2 are the same, the torque ripple is reduced while suppressing torque decrease. As a result, the rotation performance of the rotor 10C is improved.

The third embodiment has the advantages described below.

(10) In the third embodiment, the magnetic pole occupying angle θ1 of the magnet 13 is set in the range of 180°<θ1≤200° in the motor M of which the ratio X1:X2 of the magnetic pole portion quantity X1 of the rotor 10C and the slot quantity X2 of the stator X2 is 3n+2:3n (n is an even number). Thus, compared to a structure in which the magnetic pole occupying angle θ1 of the magnet 13 and the magnetic pole occupying angle θ2 of the salient pole 12a are the same, the motor M of the third embodiment reduces torque ripple while suppressing torque decrease (see FIG. 11). This improves the rotation performance of the rotor 10C.

(11) In the third embodiment, the magnetic pole occupying angle θ1 of the magnet 13 is set in the range of 182°θ1≤197°. Thus, compared to a structure in which the magnetic pole occupying angle θ1 of the magnet 13 and the magnetic pole occupying angle θ2 of the salient pole 12a are the same, the motor M of the third embodiment reduces the torque ripple to about 98% (see FIG. 11). This further improves the rotation performance of the rotor 10C.

(12) In the third embodiment, the magnetic pole occupying angle θ1 of the magnet 13 is set in the range of 185°θ1≤195°. Thus, compared to a structure in which the magnetic pole occupying angle θ1 of the magnet 13 and the magnetic pole occupying angle θ2 of the salient pole 12a are the same, the motor M of the third embodiment reduces the torque ripple to about 96% (see FIG. 11). This further improves the rotation performance of the rotor 10C.

(13) In the third embodiment, the clearance S1 is formed between a magnet 13 and salient pole 12a that are adjacent to each other in the circumferential direction of the rotor 10C. Accordingly, advantage (4) of the first embodiment is also obtained.

The third embodiment may be modified as described below.

In the third embodiment, the magnetic pole occupying angle θ1 of the magnet 13 is set in the range of 185° Sθ1≤195° but may be set in a wider range of 182°≤θ1≤197° or an even wider range of 180°<θ1≤200°.

In the third embodiment, the ratio X1:X2 of the magnetic pole portion quantity X1 of the rotor 10C and the slot quantity X2 of the stator 20 is set to 14:12, that is, n+2:3n ("n" is 4). However, the value of "n" may be changed when required to another even number. The ratio X1:X2 of the magnetic pole portion quantity X1 of the rotor 10C and the slot quantity X2 of the stator 20 may be set to 3n+1:3n ("n" is an odd number), for example, the ratio X1:X2 may be set to 4:3 or 7:6.

The numerical ranges in the third embodiment may be changed as required in accordance with the situation or the like.

The first to third embodiments of the present invention may include the structures of fourth to ninth embodiments, which will now be discussed.

Fourth Embodiment

A fourth embodiment will now be discussed with reference to FIGS. 12 to 16. The same reference numerals are given to those components that are the same as the corresponding components of the first embodiment. Such components will not be described in detail.

Figure 12:
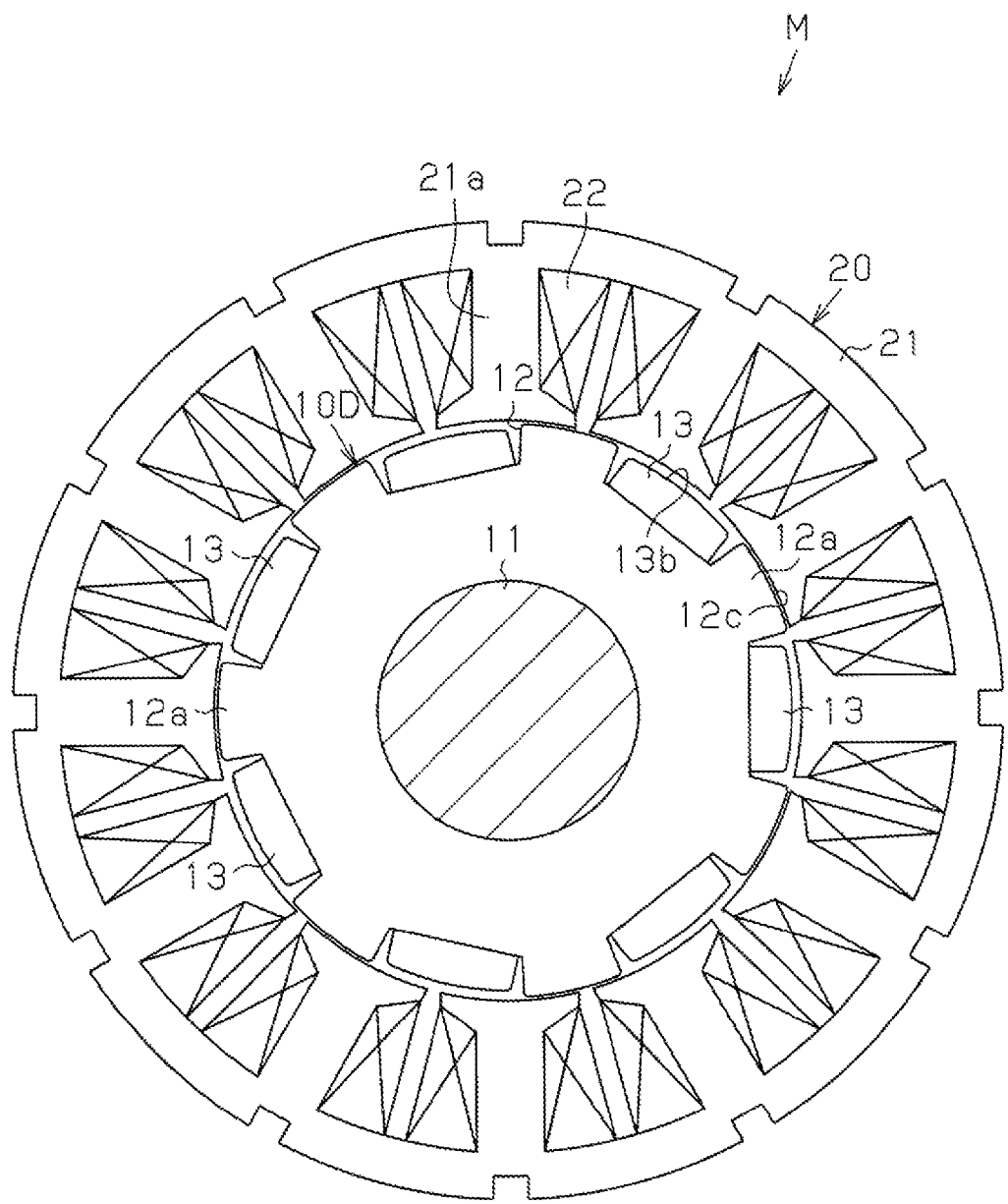
FIG. 12 is a plan view showing a motor according to a fourth embodiment of the present invention.
Figure 13:
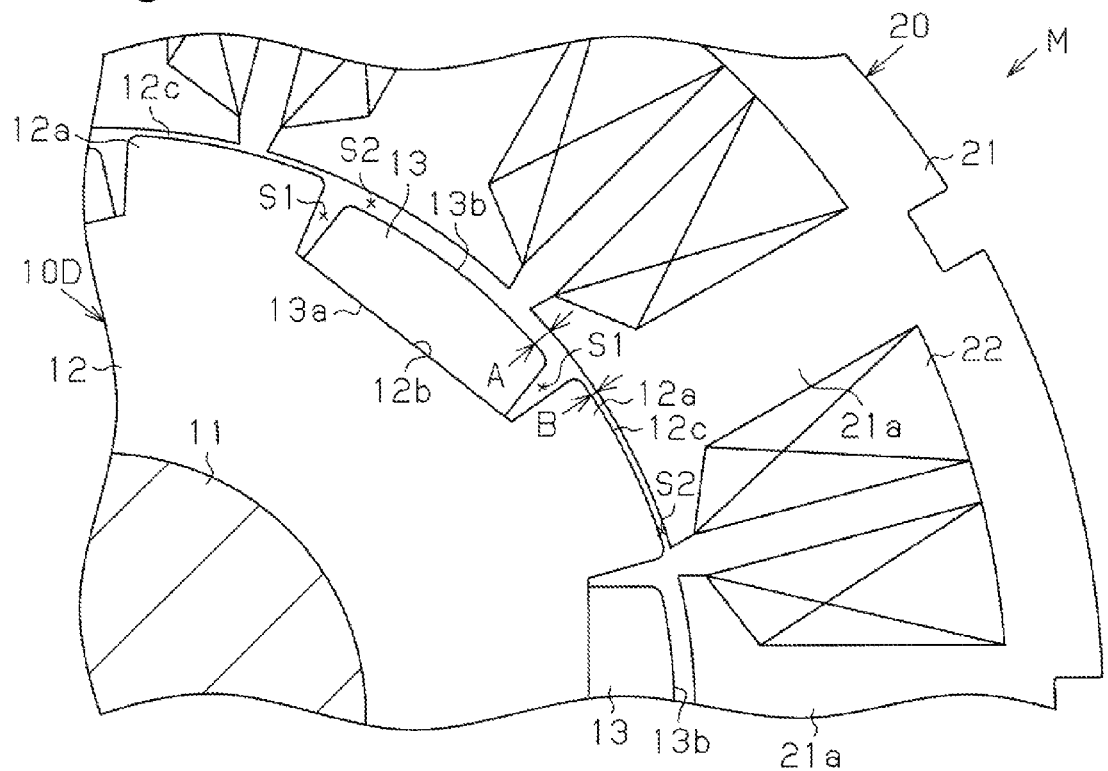
FIG. 13 is a partially enlarged view showing the motor of the fourth embodiment.

As shown in FIGS. 12 and 13, the motor M of the fourth embodiment uses a rotor 10D including seven N-pole magnets 13, which are arranged along the circumferential direction of the rotor core 12, and seven salient poles 12a, which are arranged between adjacent ones of the magnets 13 in the circumferential direction. The salient poles 12a function as the S-poles. In other words, the rotor 10D is a so-called consequent pole type having fourteen magnetic pole portions. The stator 20 includes twelve teeth 21a in the same manner as the first embodiment.

The circumferential length of the salient pole 12a is slightly shorter than the circumferential length of the magnet 13 by an amount corresponding to the clearance S1.

In the fourth embodiment, the outer surface 12c of the salient pole 12a is arranged outward in the radial direction relative to the outer surface 13b of the magnet 13. In other words, a radial distance B between the salient pole 12a and the stator 208B is less than a radial distance A between the magnet 13 and the stator 20 in the clearance S2 between the stator 20 (distal surface of the teeth 21a) and the rotor 10D. Each of the radial distances B and A is constant in the circumferential direction. That is, the radial distance A is the shortest radial distance at any location in the circumferential direction corresponding to the magnet 13, and the radial distance B is the shortest radial distance at any location in the circumferential direction corresponding to the magnet 13.

Figure 15:
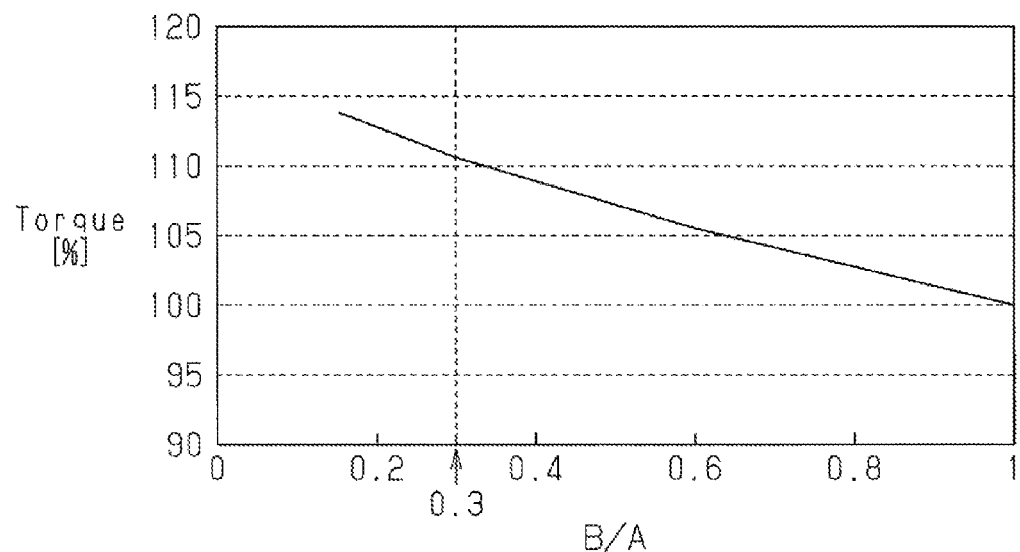
FIG. 15 is a graph showing the relationship of the clearance distance ratio B/A and torque ratio in the fourth embodiment.
Figure 16:
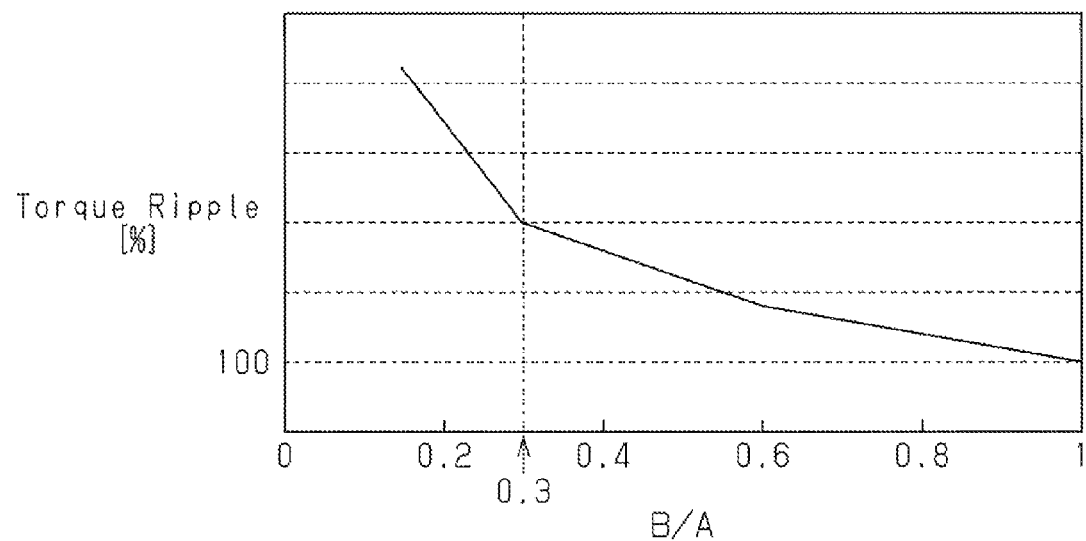
FIG. 16 is a graph showing the relationship of the clearance distance ratio B/A and torque ripple ratio in the fourth embodiment.

FIG. 4 shows the variation in the radial force received by the teeth 21a when changing the ratio B/A of the clearance distances B and A, FIG. 15 shows the torque, and FIG. 16 shows the torque ripple.

Figure 14:
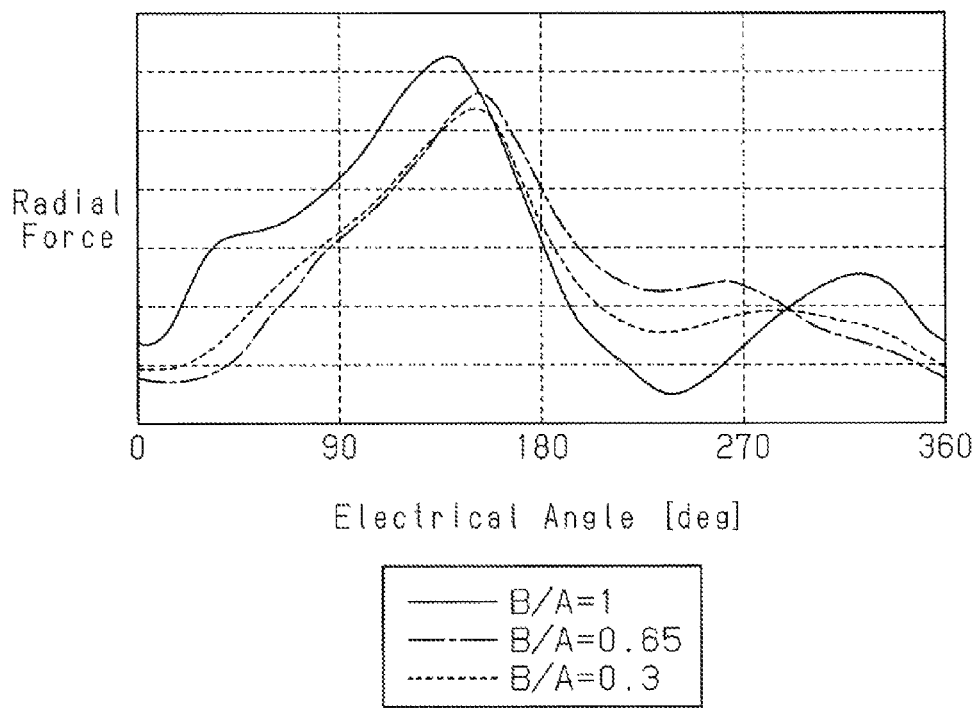
FIG. 14 is a graph showing the relationship of a clearance distance ratio B/A and radial force change in the fourth embodiment.

FIG. 14 shows the variation in the radial force received by a single tooth 21a when changing the ratio to B/A=1, B/A=0.65, and B/A=0.3. For B/A=1, the difference between the maximum value and the minimum value of the radial force is large and the variation is random. For B/A=0.65, the difference between the maximum value and the minimum value is small and the variation slightly stabilizes. For B/A=0.3, the difference between the maximum value and the minimum value becomes smaller, and the variation stabilizes to the same extent.

FIG. 15 shows the torque of the motor M when changing the ratio B/A. The magnitude of the torque is defined as 100% when B/A=1 is satisfied, that is, when the radial distances B and A of the salient pole 12a and the magnet 13 are the same. In FIG. 15, the torque increases in a substantially constant manner as B/A becomes smaller (as the salient pole 12a projects relative to the magnet 13). The torque increases to about 110% when B/A=0.3 is satisfied.

FIG. 16 shows the torque ripple when changing the B/A. The magnitude of the torque ripple is defined as 100% when B/A=1 is satisfied. The torque ripple increases as the B/A decreases. In this case, the variation rate of the torque ripple is slightly greater when changing the B/A from 0.6 to 0.3 than when changing the ratio B/A from 1 to 0.6, and the variation rate of the torque ripple suddenly increases from B/A=0.3.

Accordingly, the ratio B/A of the radial distances B and A is set within a range of 0.3≤B/A<1 in the rotor 10D of the fourth embodiment. That is, in the fourth embodiment, the radial distances B and A are each optimized to appropriately increase the gap permanence at the side of the salient pole 12a and increase the intensity of the magnetic field acting on the stator 20. This increases the motor torque while suppressing an increase in torque ripple (torque pulsation). Thus, the rotation performance of the rotor 10D is improved.

The fourth embodiment has the advantages described below.

(14) In the fourth embodiment, the ratio B/A of the radial distance A and the radial distance B is set in the range of $0.3 \leq B/A < 1$. This increases the motor torque while suppressing an increase in torque ripple (see FIGS. 15 and 16) and improves the rotation performance of the rotor 10D. That is, the rotation performance of the motor M is improved.

(15) In the fourth embodiment, the outer surface 13b of the magnet 13 is arranged inward relative to the outer surface 12c of the salient pole 12a. This allows for the attachment of a scattering prevention cover of the magnet 13 using the space produced by the inward arrangement. Thus, the salient pole 12a, which does not need to be covered, is arranged closer to the stator 20 by a distance corresponding to the thickness of the cover. This increases the motor torque.

Fifth Embodiment

A fifth embodiment will now be discussed with reference to FIGS. 17 and 18.

Figure 17:
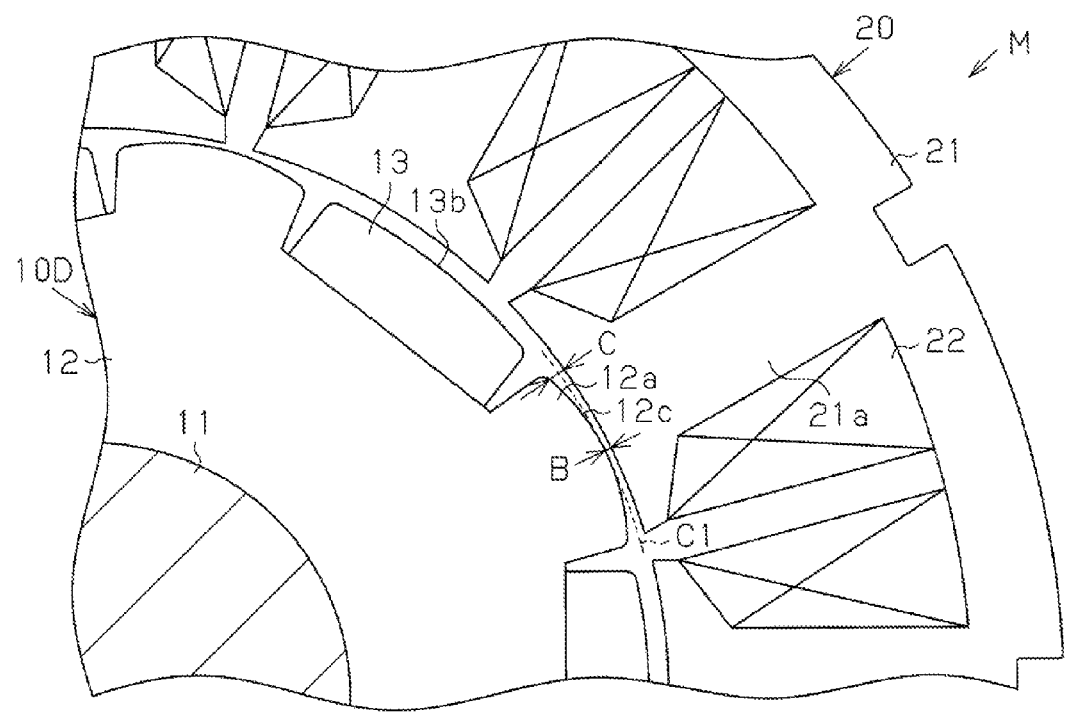
FIG. 17 is a partially enlarged view of a motor according to a fifth embodiment of the present invention.

As shown in FIG. 17, in the rotor 10D of the fifth embodiment, the outer surface 12c of the salient pole 12a has a larger curvature than the outer surface 12c of the fourth embodiment. The curvature is constant throughout the entire outer surface 12c. Accordingly, the central part in the circumferential direction of the outer surface 12c projects outward in the radial direction relative to the two ends in the circumferential direction. More specifically, when a circumference having substantially the same curvature as a circumference connecting the distal surfaces of the teeth 21a of the stator 20 and passing by the central part in the circumferential direction of each salient pole 12a, or the outermost circumferential part of the salient poles 12a, defines a reference circumference C1, the salient pole 12a becomes more spaced apart from the circumference C1 as the circumferential ends of the salient pole 12a become closer.

With respect to the outer surface 12c, the radial distance (shortest radial distance) between the circumferential central part and the stator 20 (distal surface of the teeth 21a) is represented by B, and the radial distance between the circumferential ends and the stator 20 is represented by C. In this case, the radial force pulsation received by the teeth 21a when changing the ratio C/B is shown in FIG. 18.

Figure 18:
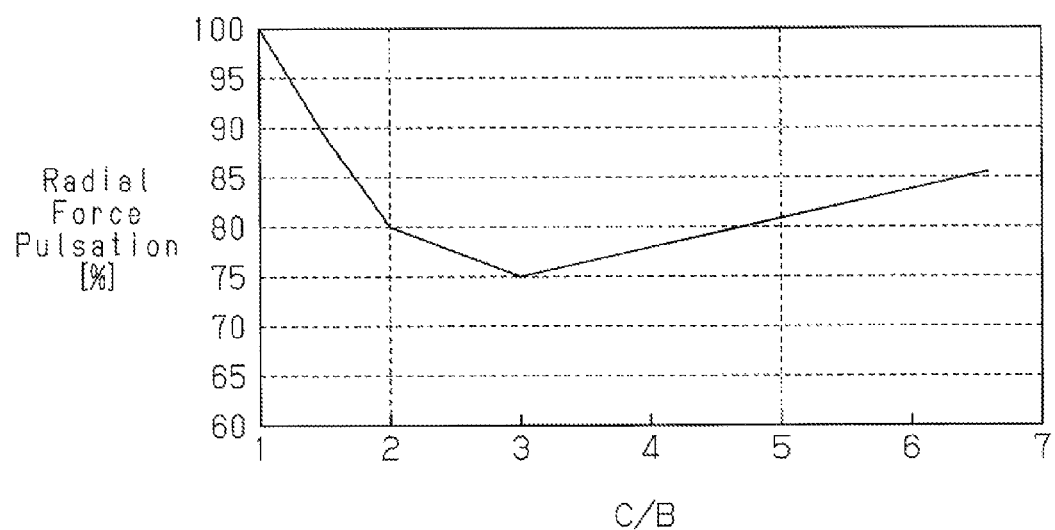
FIG. 18 is a graph showing the relationship of a clearance distance ratio C/B and a radial force pulsation ratio in the fifth embodiment.

FIG. 18 shows the magnitude of the radial force pulsation when changing the ratio C/B. When C/B=1 is satisfied and the radial distances B and C are the same, that is, when the circumferential central part and the circumferential ends are both located on the circumference C1, the magnitude of the radial force pulsation is 100%. As the ratio C/B increases, that is, as the curvature of the outer surface 12c of the salient pole 12a increases, the radial force pulsation varies in a manner that it decreases once but then increases again as the circumferential ends become relatively far from the stator 20. The radial force pulsation drastically decreases when the C/B is 1 to 2 but is still 80% and large when the C/B is 2. The radial force pulsation varies relatively stably from 80% to 75% when the C/B is 2 to 5. The radial force pulsation gradually decreases from 80% to 75% when the C/B is 2 to 3, and the radial force pulsation gradually increases from 75% to 80% when the C/B is 3 to 5. After C/B increases from 5, the radial force pulsation gradually increases from 80% at the same rate as when the C/B is 3 to 5.

Accordingly, the ratio C/B of the radial distances B and C is set in a range of $2 \leq C/B \leq 5$ in the rotor 10D of the fifth embodiment. In the fifth embodiment, the radial force pulsation is thus suppressed to less than or equal to about 80%. This decreases the radial force received by the stator 20, and reduces vibration of the motor M.

The fifth embodiment has the advantages described below.

(16) In the fifth embodiment, the ratio C/B is set within the range of $2 \leq C/B \leq 5$. This decreases the pulsation of the radial force received by the stator 20 is thus reduced (see FIG. 18) and reduces vibration of the motor M.

The fourth and fifth embodiments may be modified as described below.

The numerical ranges in the fourth and fifth embodiments may be changed as required in accordance with the situation or the like.

In the fifth embodiment, the curved shape of the outer surface 12c has a constant curvature. However, the curvature of the outer surface 12c may be partially changed. Further, the shape of the outer surface 12c may be changed to be linear. Further, just the corners of the salient poles 12a may be rounded or chamfered.

The structures of the fourth and fifth embodiments are applied to the rotor 10D that includes fourteen magnetic pole portions, which are formed by the seven salient poles 12a and the seven magnets 13. However, the quantity of the magnetic pole portions may be changed as required, and the quantity of the magnetic pole portions on the stator side may be changed accordingly.

Sixth Embodiment

A sixth embodiment will now be discussed with reference to FIGS. 19 to 23. The same reference numerals are given to those components that are the same as the corresponding components of the first embodiment. Such components will not be described in detail.

Figure 19:
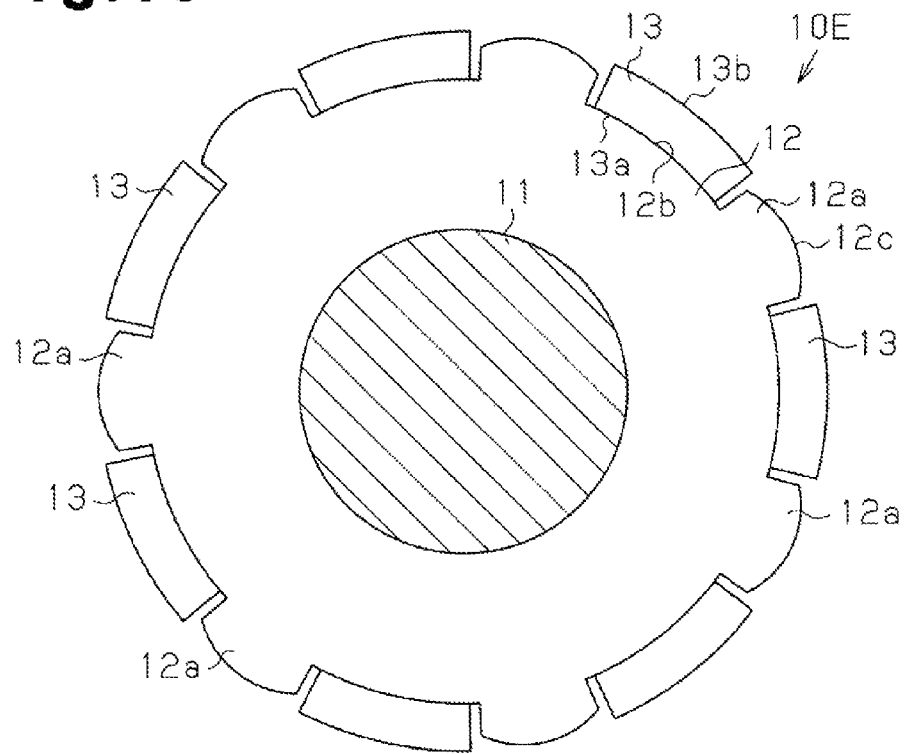
FIG. 19 is a plan view showing a rotor according to a sixth embodiment of the present invention.
Figure 20:
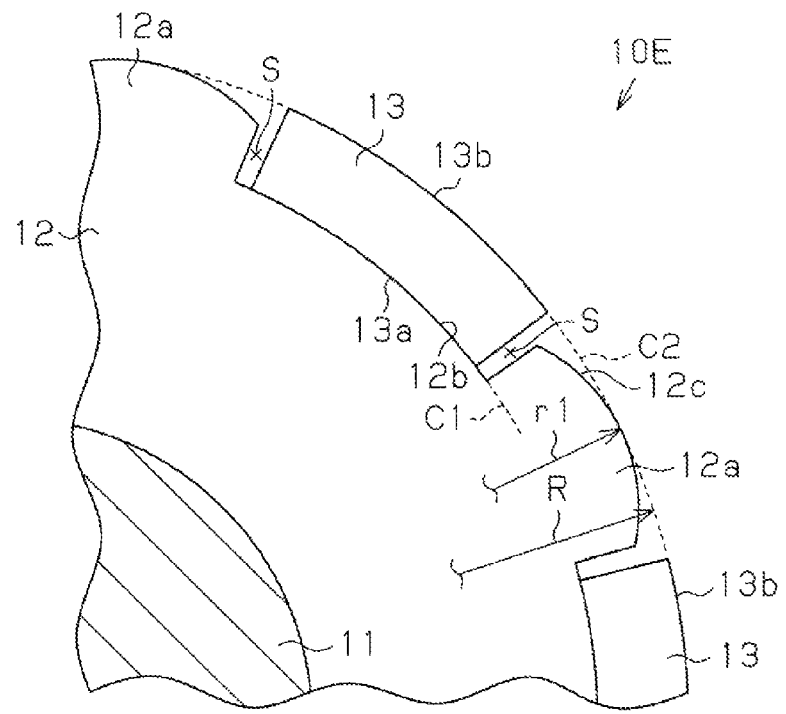
FIG. 20 is a partially enlarged view showing the rotor of the sixth embodiment.

FIGS. 19 and 20 show a rotor 10E of the sixth embodiment. The rotor 100E includes seven N-pole magnets 13, which are arranged along the circumferential direction of the rotor core 12, and salient poles 12a, which are arranged between adjacent ones of the magnets 13 in the circumferential direction. The salient poles 12a function as the S-poles. In other words, the rotor 10B is a so-called consequent pole type having fourteen magnetic pole portions.

The magnet 13 has a circumferential length that is slightly longer than that of the salient pole 12a. The magnet 13 has a curved shape and a thickness (dimension in the radial direction) that is constant in the circumferential direction. Accordingly, the inner surface 13a and the outer surface 13b of the magnet 13 are parallel. The fixation surface 12b of the rotor core 12, to which the inner surface 13a of the magnet 13 is fixed, has a curved shape that conforms to the inner surface 13a. A clearance (gap in the circumferential direction) S is formed between a magnet 13 and salient pole 12a that are adjacent to each other in the circumferential direction. In the same manner as the second embodiment, the clearance S formed between the inner surface 13a of the magnet 13 and the salient pole 12a is set to be about one to two times greater than the clearance between the rotor 10E and the stator.

The salient pole 12a includes a central part in the circumferential direction and two ends in the circumferential direction. With respect to a circumference C1 connecting the inner surfaces 13a of the magnets 13, the circumferential central part has a large projecting length, and the two circumferential ends have a projecting length that is smaller than the circumferential central part. Further, the salient pole 12a is shaped in symmetry in the circumferential direction. In other words, the projecting length decreases from the central circumferential part to the two circumferential ends. The circumferential central part in the outer surface 12c of the salient pole 12a, that is, at least part of the outer surface 12c lies along a circumference C2 connecting the outer surfaces 13b of the magnets 13. Further, the circumferential ends of the outer surface 12c are located radially inward from the circumference C2. That is, the outer surface 12c of the salient pole 12a has a curvature that is greater than the curvature of the circumference C2, which connects the outer surfaces 13b of the magnets 13, and thereby has a radius of curvature that is smaller than the radius of curvature of the circumference C2. Thus, the outer surface 12c is gradually distanced from the stator as the circumferential ends become closer from the central part.

Here, the radius of the circumference C2 connecting the outer surface 13b of each magnet 13 is represented by R, and the radius of the outer surface 12c of each salient pole 12a is represented by r1. In this case, when changing the ratio r1/R, the surface magnetic flux density variation of the rotor 10E is shown in FIG. 21, the torque is shown in FIG. 22, and the torque ripple is shown in FIG. 23.

Figure 21:
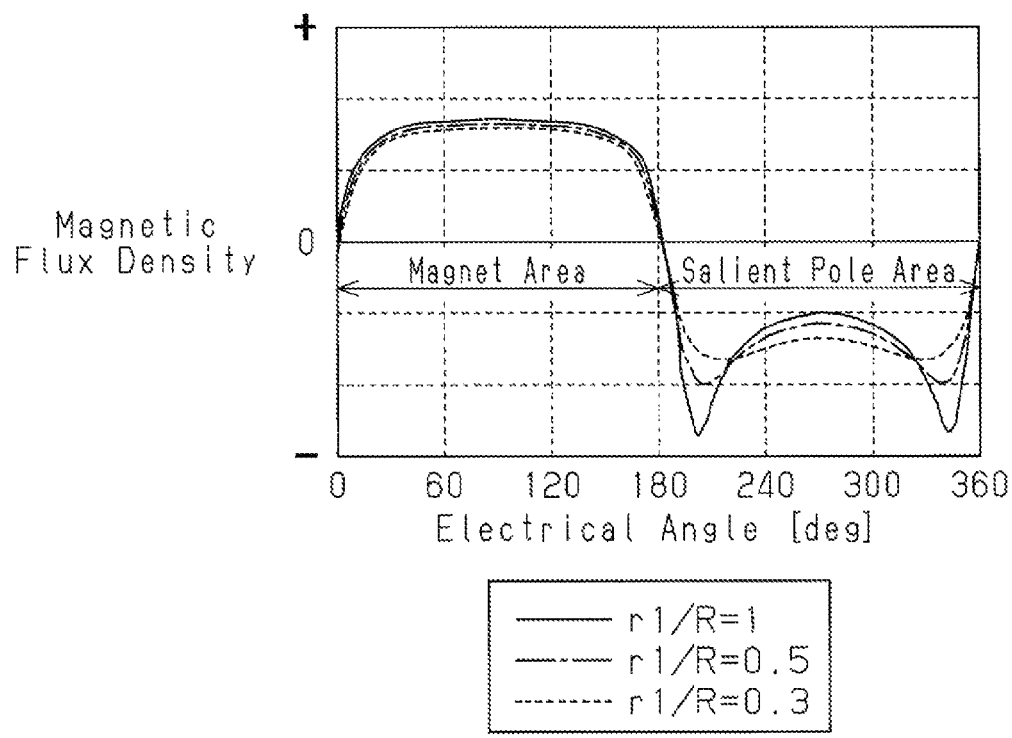
FIG. 21 is a graph showing the relationship of an r1/R ratio and magnetic flux density variation in the sixth embodiment.

FIG. 21 shows the magnetic flux density variation when changed the ratio to r1/R1=1, r1/R=0.5, and r1/R=0.3. The magnetic flux density variation in the magnetic pole zone of the magnet 13 is small even if the ratio of r1/R is changed, and the magnetic flux density variation forms a substantially trapezoidal shape with a smooth curve. In contrast, the magnetic flux density variation in the magnetic pole zone of the salient pole 12a greatly differs in accordance with the ratio of r1/R. When the r1/R is 1, that is, when the outer surface 12c of the salient pole 12a has the same curvature as the circumference C2 connecting the outer surfaces 13b of the magnets 13, the magnetic flux density near the ends of the magnetic pole zone of the salient pole 12a projects out and varies greatly, and the drop in the magnetic flux density is large near the middle of the magnetic pole zone. When the ratio becomes smaller, such as when r1/R=0.5 or r1/R=0.3 is satisfied, that is, when the curvature of the outer surface 12c of the salient pole 12a is greater than the circumference C2, a clearance between the circumferential ends of the salient pole 12a and the stator is enlarged. Thus, the projection variation rate of the magnetic flux density near the ends of the magnetic pole zone of the salient pole 12a is small, and the drop rate of the magnetic flux density near the middle of the magnetic pole zone also becomes small.

Figure 22:
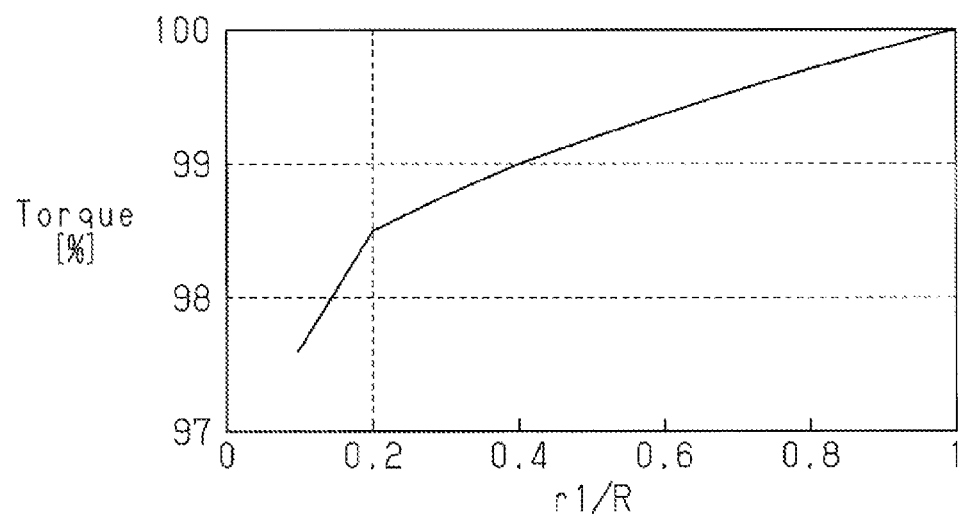
FIG. 22 is a graph showing the relationship of the r1/R ratio and torque ratio in the sixth embodiment.

FIG. 22 shows the torque of the motor when the ratio r1/R is changed. The magnitude of the torque is defined as 100% when r1/R=1 is satisfied, that is, when the curvature of the outer surface 12c of the salient pole 12a is not changed. The torque becomes small, although slightly, as the r1/R decreases (as the curvature of the outer surface 12c of the salient pole 12a becomes greater than the circumference C2). The torque is decreased by a small amount until it becomes about 98.5% when the r1/R is 0.2, and the decreasing amount becomes greater, although slightly, from when the ratio r1/R is 0.2.

Figure 23:
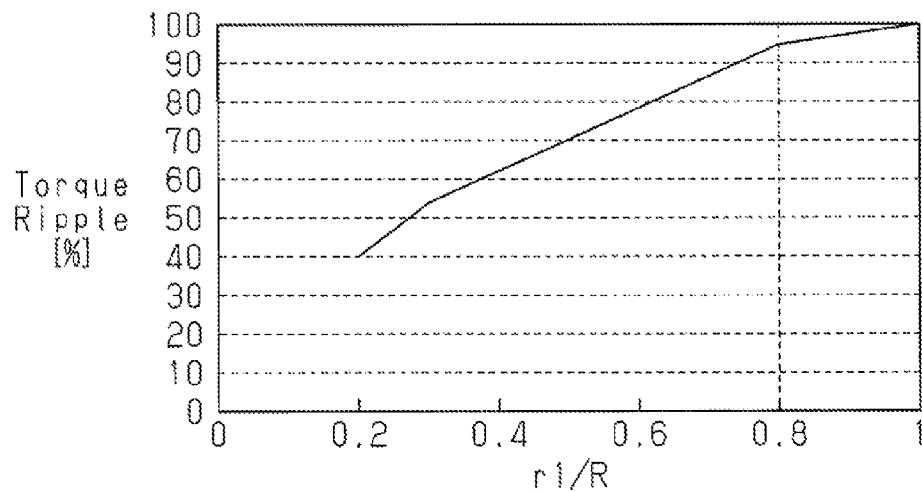
FIG. 23 is a graph showing the relationship of the r1/R ratio and torque ripple ratio in the sixth embodiment.

FIG. 23 shows the torque ripple when the ratio r1/R is changed. The magnitude of the torque ripple is defined as 100% when r1/R=1 is satisfied, that is, when the curvature of the outer surface 12c of the salient pole 12a is not changed. The torque ripple sufficiently decreases as the ratio r1/R decreases. The torque ripple is decreased by a relatively small amount until it becomes about 95% when the ratio r1/R is 0.8. However, the decreasing amount becomes greater from when r1/R is 0.8, and the torque ripple decreases to about 55% when the ratio r1/R is 0.3. The decreasing amount of the torque ripple further increases from when the ratio r1/R is 0.3. The torque ripple is particularly greatly decreased from when the ratio r1/R is 0.8. This further reduces torque pulsation.

Accordingly, in the rotor 10E of the sixth embodiment, the curvature of the outer surface 12c of the salient pole 12a is set so that the ratio r1/R is within a range of 0.2≤r1/R≤0.8. That is, in the sixth embodiment, the arrangement of the clearance S between the magnet 13 and the salient pole 12a suppresses sudden surface magnetic flux density variation of the rotor 10E. Additionally, sudden surface magnetic flux density variation is further suppressed while minimizing torque decrease, and torque pulsation is further reduced.

The rotor 10E of the sixth embodiment is used in an inner rotor type motor. Accordingly, the area of the outer surfaces 12c and 13b of the salient pole 12a and the magnet 13, that is, the area of the surface facing towards the stator, is greater than the inner surface. Further, the magnetic path that extends from the magnet 13 through the rotor core 12 and out of the salient pole 12a is shortened thereby reducing magnetic loss. Thus, even when the volume of the entire motor is the same as an outer rotor type motor, the magnetic flux density formed with the stator is increased and higher torque is obtained in comparison to the outer rotor type in which the inner surface of the rotor core faces toward the stator.

The sixth embodiment has the advantages described below.

(17) In the sixth embodiment, the salient pole 12a includes the outer surface (surface) 12c, which has a curved shape of a constant curvature. The ratio r1/R of the radius r1 of the outer surface 12c and the radius R of the reference circumference C2 is set within the range of 0.2≤r1/R≤0.8. In this range, the two circumferential ends in the outer surface 12c of the salient pole 12a are gradually distanced inward in the radial direction in a curved manner from the reference circumference C2. This enlarges the clearance from the stator as the circumferential ends of the salient pole 12a become closer. Thus, the projection of the magnetic flux density near the end of the magnetic pole zone of the salient pole 12a decreases, and the dropping rate of the magnetic flux density also decreases near the middle of the magnetic pole zone. As a result, in addition to the arrangement of the clearance S between the magnet 13 and the salient pole 12a suppressing sudden magnetic flux density variation of the rotor 10E, sudden surface magnetic flux density variation is further suppressed, and torque pulsation is further reduced. The ratio r1/R of the radius r1 of the outer surface 12c of the salient pole 12a and the radius R of the reference circumference C2 is set within the range of 0.2≤r1/R≤0.8. Thus, torque ripple is further reduced while suppressing torque decrease of the motor, and torque pulsation is further reduced (see FIGS. 22 and 23).

This increases the motor output and reduces motor vibration.

Seventh Embodiment

Figure 24:
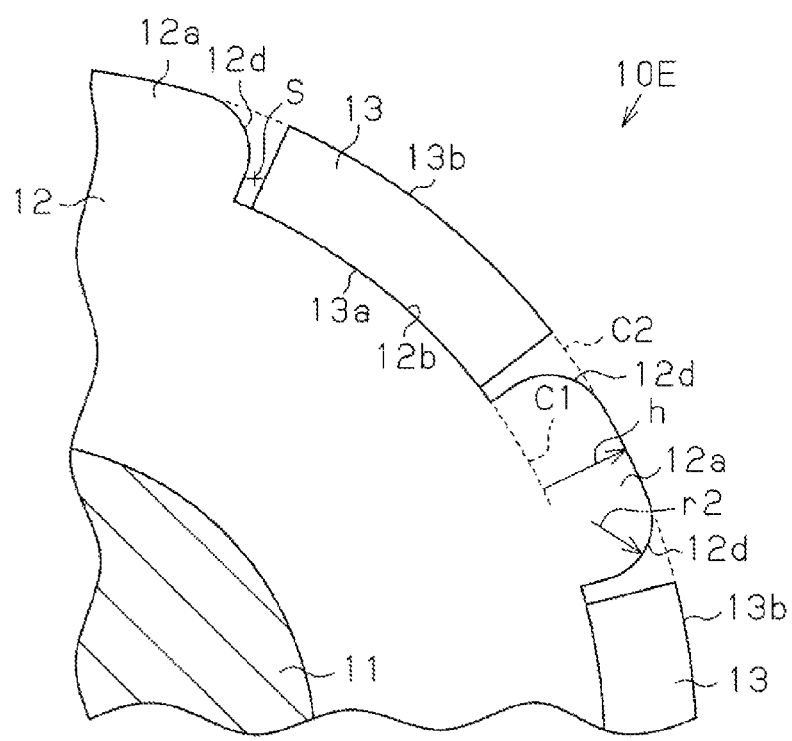
FIG. 24 is a partially enlarged view of a rotor according to a seventh embodiment of the present invention.

A seventh embodiment will now be discussed with reference to FIGS. 24 to 26.

In the sixth embodiment, the curvature of the entire outer surface 12c of the salient pole 12a is optimized. In the seventh embodiment, the curvature of the rounded shape of the corner 12d at each of the two circumferential ends of the salient pole 12a is optimized, as shown in FIG. 24. More specifically, the outer surface 12c of the salient pole 12a is more distance from the stator as the circumferential ends become closer from the central part.

Here, the radius of the corner 12d of the salient pole 12a is represented by r2, and the projecting length of the salient pole 12a from the circumference C1 connecting the inner surfaces 13a of the magnets 13 is represented by h. In this case, when changing the ratio r2/h, the torque of the rotor 10E is shown in FIG. 25, and the torque ripple is shown in FIG. 26.

Figure 25:
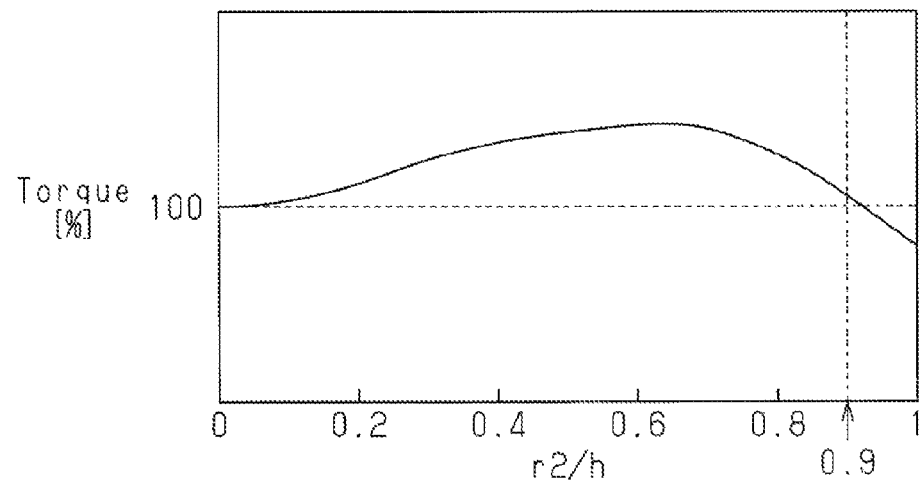
FIG. 25 is a graph showing the relationship of an r2/R ratio and torque ratio in the seventh embodiment.

FIG. 25 shows the torque of the motor when changing r2/h. The magnitude of the torque of the motor is defined as 100% when r2/h is 0, that is, when the corner 12d is not rounded. The torque gradually increases as r2/h increases and becomes maximum when r2/h is approximately 0.6 and then gradually decreases. After the torque becomes less than 100% when r2/h is approximately 0.9, the torque further decreases until r2/h reaches 1.

Figure 26:
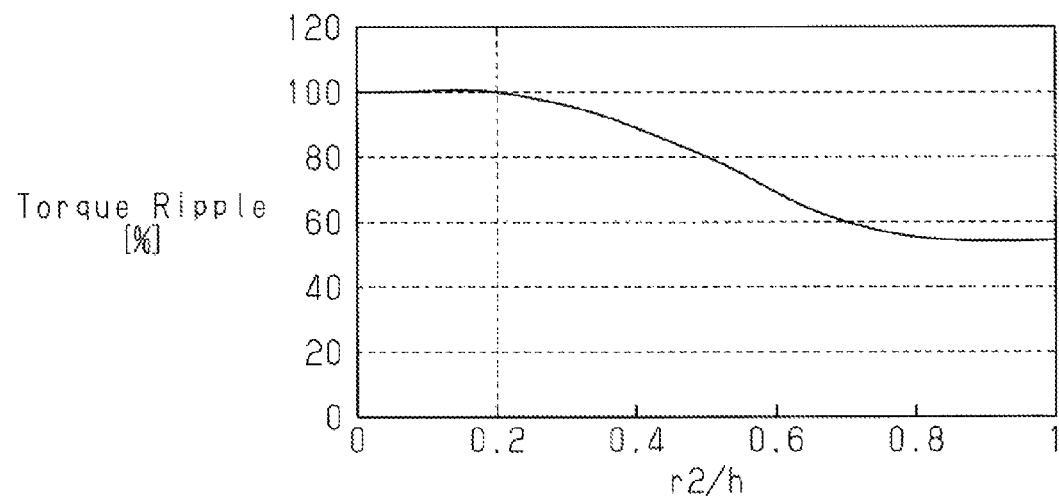
FIG. 26 is a graph showing the relationship of the r2/R ratio and torque ripple ratio in the seventh embodiment.

FIG. 26 shows the torque ripple when changing r2/h. The magnitude of the torque ripple is defined as 100% when r2/h is 0, that is, when the corner 12d of the salient pole 12a is not rounded. The torque ripple increases, although slightly, until r2/h reaches 0.2, and becomes less than 100% after r2/h reaches 0.2. The torque ripple becomes about 50% when r2/h is approximately 0.8 and subtly varies from when r2/h reaches 0.9.

Accordingly, the projecting length h of the salient pole 12a and the radius r2 of the corner 12d in the rotor 10E of the seventh embodiment are set so that r2/h is within a range of $0.2 \leq r2/h \leq 0.9$. As a result, in the seventh embodiment, sudden magnetic flux density variation is further suppressed without lowering the torque of the motor as much as possible, and torque pulsation is further reduced.

The seventh embodiment has the advantages described below.

(18) In the seventh embodiment, the corners 12d located at the two circumferential ends of the salient pole 12a are rounded, and the ratio r2/h of the radius r2 of the corner 12d and the projecting length h of the salient pole 12a is set within the range of $0.2 \leq r2/h \leq 0.9$. That is, when the salient pole 12a is formed so that r2/h is within this range, the two circumferential ends of the outer surface 12c of the salient pole 12a are gradually distanced inward in the radial direction in a curved manner from the reference circumference C2. Thus, in the same manner as the advantages of the sixth embodiment, sudden magnetic flux density variation of the rotor 10E is further suppressed, and torque pulsation is further reduced. Further, the r2/h is set within the range of $0.2 \leq r2/h \leq 0.9$. Thus, the torque ripple is further reduced while suppressing a motor torque decrease, and torque pulsation is further reduced (see FIGS. 25 and 26). This increases the motor output and reduces motor vibration.

Eighth Embodiment

An eighth embodiment will now be discussed with reference to FIGS. 27 to 31.

Figure 27:
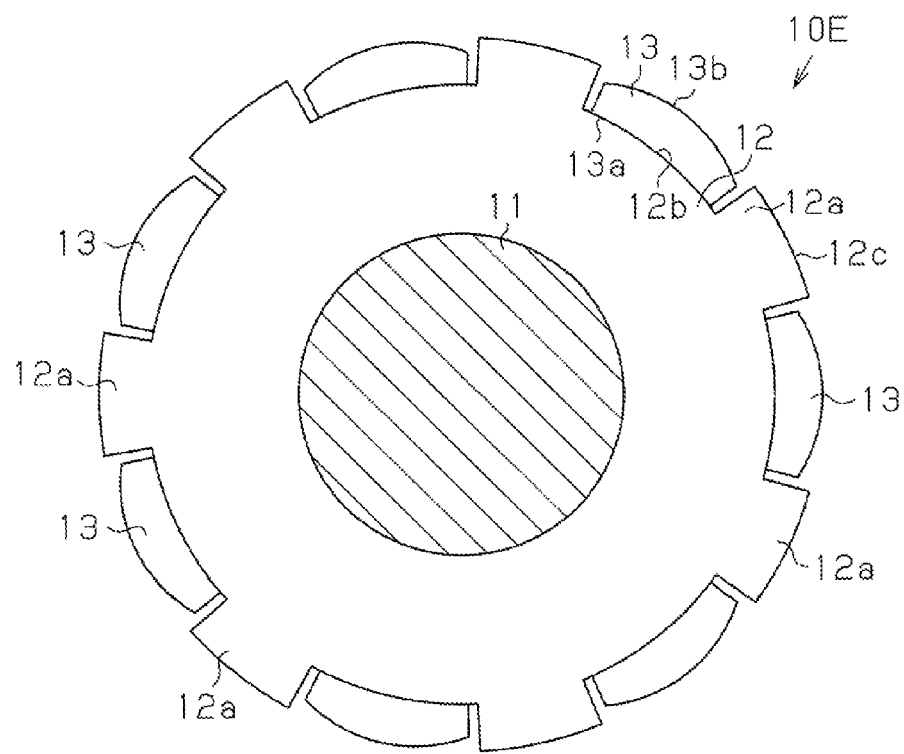
FIG. 27 is a plan view showing a rotor according to an eighth embodiment of the present invention.
Figure 28:
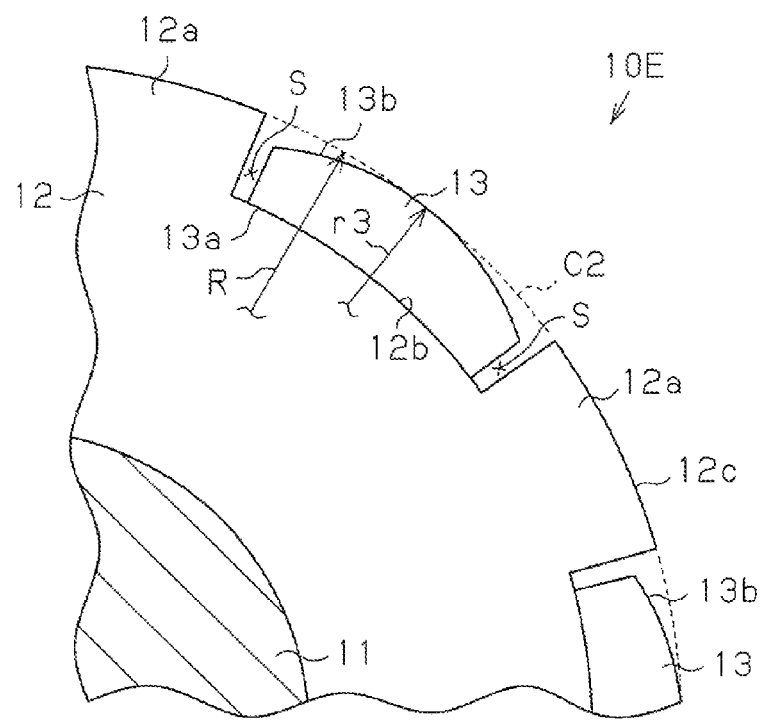
FIG. 28 is a partially enlarged view showing the rotor of the eighth embodiment.

In the sixth and seventh embodiments, the curvatures of the outer surface 12c and the corner 12d of the salient pole 12a are optimized. In the seventh embodiment, the curvature of the outer surface 13b of the magnet 13 is optimized, as shown in FIGS. 27 and 28. Specifically, the circumferential central part in the outer surface 13b of the magnet 13, that is, at least part of the outer surface 13b, lies along the circumference C2 connecting the outer surfaces 12c of the salient poles 12a. The outer surface 13b of the magnet 13 is more distanced from the stator from the circumferential central part towards as the ends.

Figure 29:
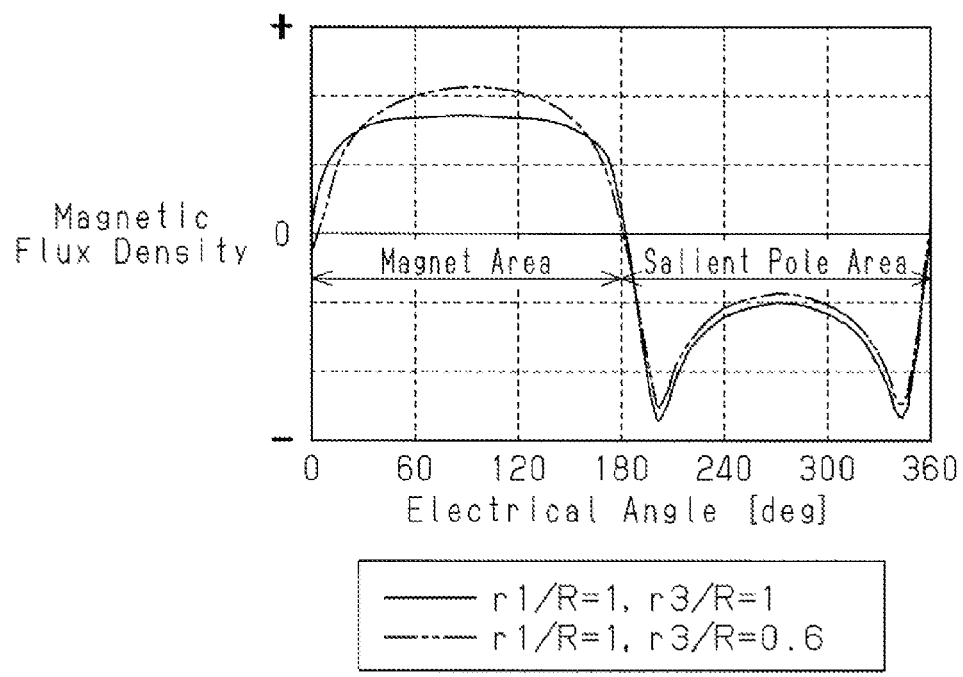
FIG. 29 is a graph showing the relationship of an r3/R ratio and magnetic flux density variation in the eighth embodiment.
Figure 30:
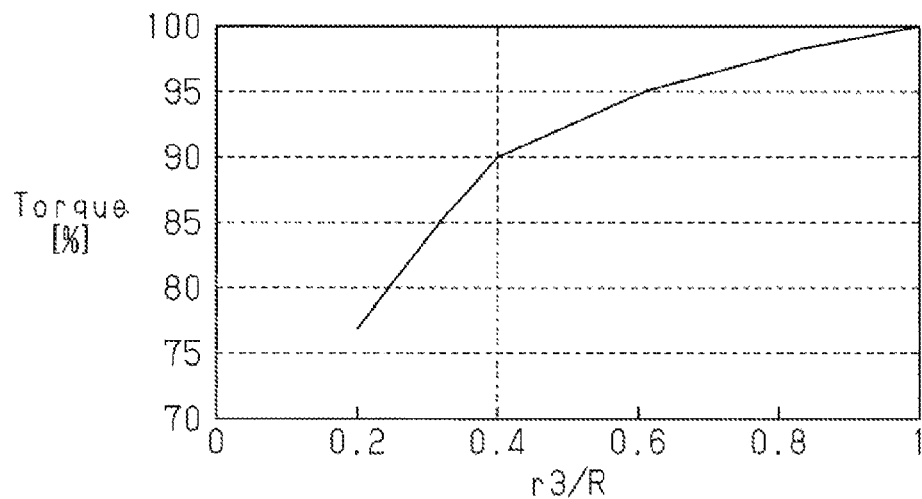
FIG. 30 is a graph showing the relationship of the r3/R ratio and torque ratio in the eighth embodiment.
Figure 31:
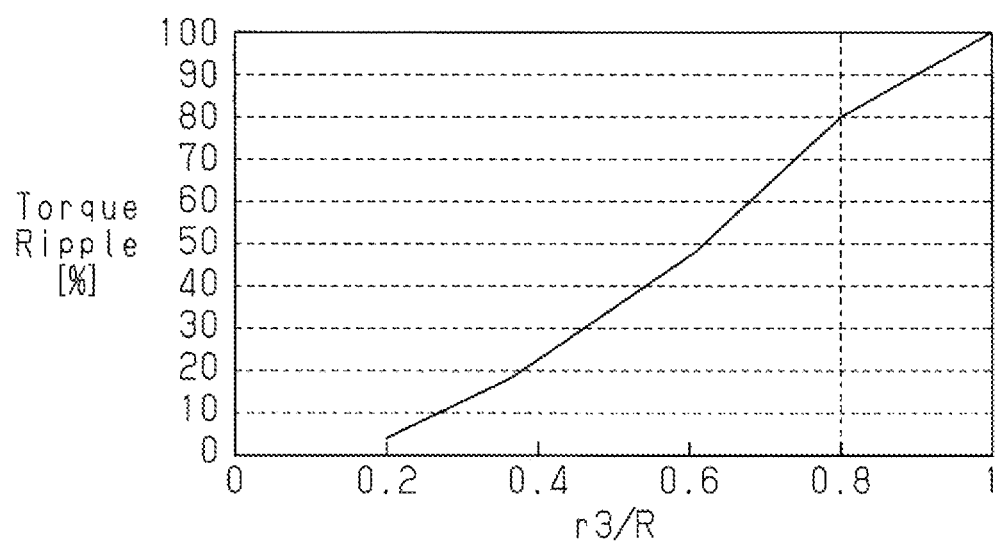
FIG. 31 is a graph showing the relationship of the r3/R ratio and torque ripple ratio in the eighth embodiment.

When changing the curvature of the outer surface 13b of each magnet 13, the radius of the outer surface 13b is represented by r3. When the curvature is not changed, the radius of the outer surface 13b, that is, the circumference C2 connecting the outer surfaces 13b of the salient poles 12a is represented by R. When changing the ratio r3/R of the radius r3 and the radius R, the surface magnetic flux density variation of the rotor 10E is shown in FIG. 29, the torque is shown in FIG. 30, and the torque ripple is shown in FIG. 31. The outer surface 12c of the salient pole 12a lies on the circumference C2 (r1/R=1).

FIG. 29 shows the magnetic flux density variation when the ratio r3/R is changed to 1 and 0.6. The magnetic flux density in the magnetic pole zone of the magnet 13 changes to a substantially trapezoidal shape when the ratio r3/R is 1 but changes to a substantially sinusoidal shape when r3/R is 0.6. Further, with regard to the magnetic flux density in the magnetic pole zone of the salient pole 12a, sudden magnetic flux density variation is improved when the ratio r3/R is 0.6, that is, when the curvature of the outer surface 13b of the magnet 13 is greater than the curvature of the circumference C2, than when the ratio r3/R is 1, that is, when the curvature of the outer surface 13b of the magnet 13 is the same as the curvature of the circumference C2.

FIG. 30 shows the torque of the motor when changing r3/R. When the magnitude of the torque is defined as 100% when the ratio r3/R is 1, the torque decreases as the ratio r3/R decreases. The torque is decreased by a relatively small amount until the ratio r3/R reaches 0.4 and is decreased by a large amount after the ratio r3/R reaches 0.4.

FIG. 31 shows the torque ripple when changing r3/R. When the magnitude of the torque ripple is defined as 100% when the ratio r3/R is 1, the torque ripple decreases as the ratio r3/R decreases. The torque ripple is decreased by a relatively small amount until the ratio r3/R reaches 0.8 at which the torque ripple is about 80%. However, the torque ripple is decreased by a large amount from when the ratio r3/R reaches 0.8, and the torque ripple decreases to about 50% when the ratio r3/R reaches 0.6. The torque ripple becomes sufficiently small from when the ratio r3/R is 0.6. In particular, the torque ripple is greatly decreased from when the ratio r3/R is 0.8. Thus, torque pulsation is further reduced.

Accordingly, in the rotor 10E of the eighth embodiment, the curvature of the outer surface 13b of the magnet 13 is set so that the ratio r3/R is within a range of $0.4 \leq r3/R \leq 0.8$. Thus, in the eighth embodiment as well, sudden magnetic flux density variation is further suppressed without lowering the torque of the motor as much as possible, and torque pulsation is further suppressed.

The eighth embodiment has the advantages described below.

(19) In the eighth embodiment, the magnet 13 has a curved shape, in which the entire outer surface (surface) 13b has a constant curvature. The ratio r3/R of the radius r3 of the outer surface 13b and the radius R of the reference circumference C2 is set within the range of $0.4 \leq r3/R \leq 0.8$. That is, the magnet 13 is formed so that the r3/R is within this range so that the two circumferential ends of the outer surface 13b are gradually distanced in a curved manner from the reference circumference C2. Thus, in the same manner as the advantages of the sixth embodiment, sudden magnetic flux density variation of the rotor 10E is further suppressed, and the torque pulsation is further reduced. Since the r3/R is set within the range of $0.4 \leq r3/R \leq 0.8$, the torque ripple is further reduced while suppressing torque decrease of the motor, and torque pulsation is further reduced (see FIGS. 30 and 31). This increases the motor output and reduces motor vibration.

The sixth to eighth embodiments may be modified as below.

The numerical ranges in the sixth to eighth embodiments may be changed as required in accordance with the situation or the like.

The curvature of the entire outer surface 12c of the salient pole 12a is optimized in the sixth embodiment. The curvature of the corner 12d of the salient pole 12a is optimized in the seventh embodiment. The curvature of the entire outer surface 13b of the magnet 13 is optimized in the eighth embodiment. These forms may be combined. For example, the curvatures of the salient pole 12a and the magnet 13 may both be optimized.

The sixth to eighth embodiments are applied to the rotor 10E including fourteen magnetic pole portions, seven salient poles 12a and seven magnets 13. However, the quantity of the magnetic pole portions of the rotor 10E may be changed as required. The quantity of the magnetic pole portions in the stator may be changed accordingly.

The first to eighth embodiments are applied to the rotors 10A to 10E used in an inner rotor type motor but may be applied as a rotor for an outer rotor type motor. In such a case, the opposing relationship of the rotor and the stator in the radial direction is reversed.

Ninth Embodiment

A ninth embodiment will now be discussed with reference to FIGS. 32 and 33. The same reference numerals are given to those components that are the same as the corresponding components of the first embodiment. Such components will not be described in detail.

Figure 32:
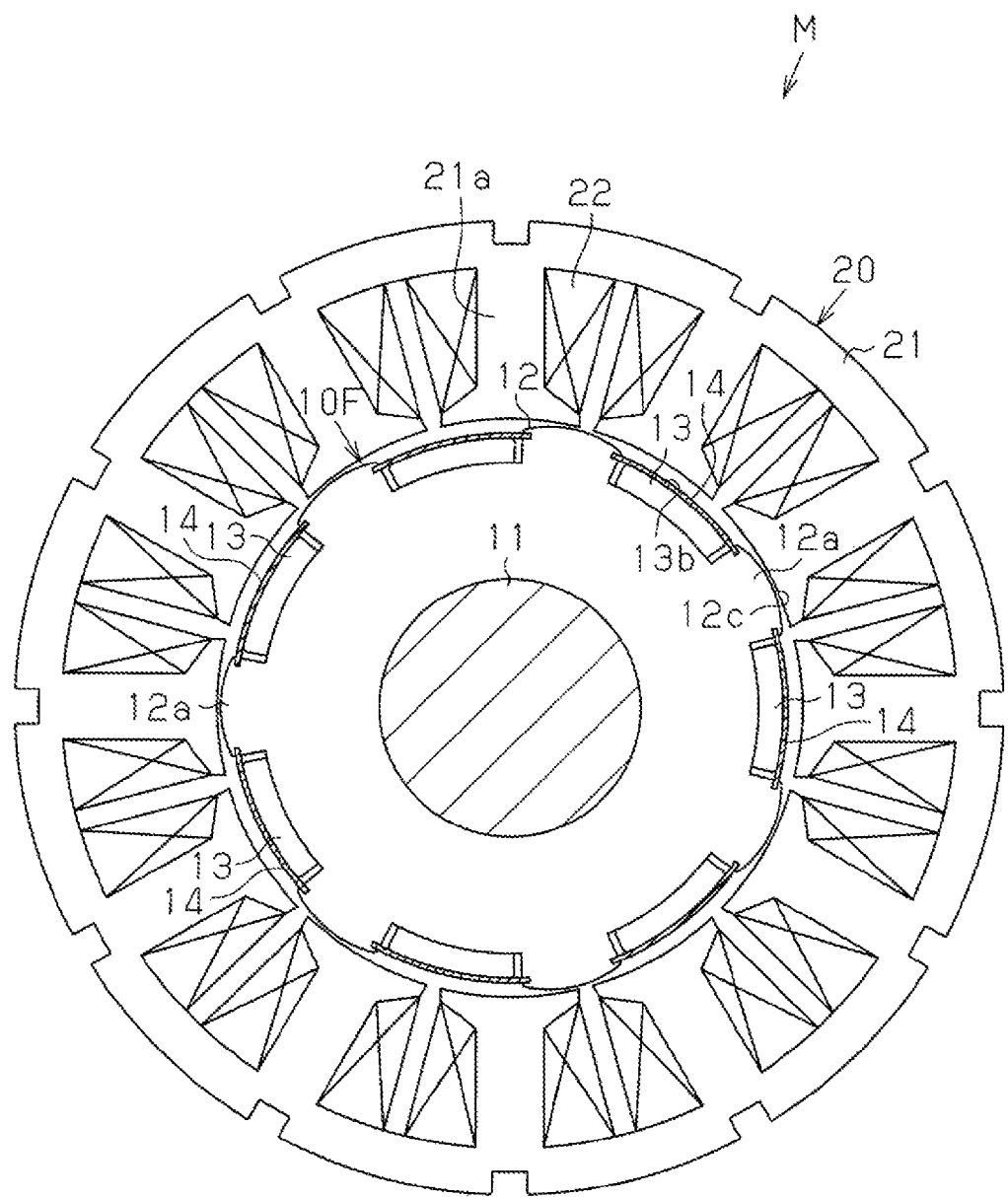
FIG. 32 is a plan view showing a motor according to a ninth embodiment of the present invention.
Figure 33:
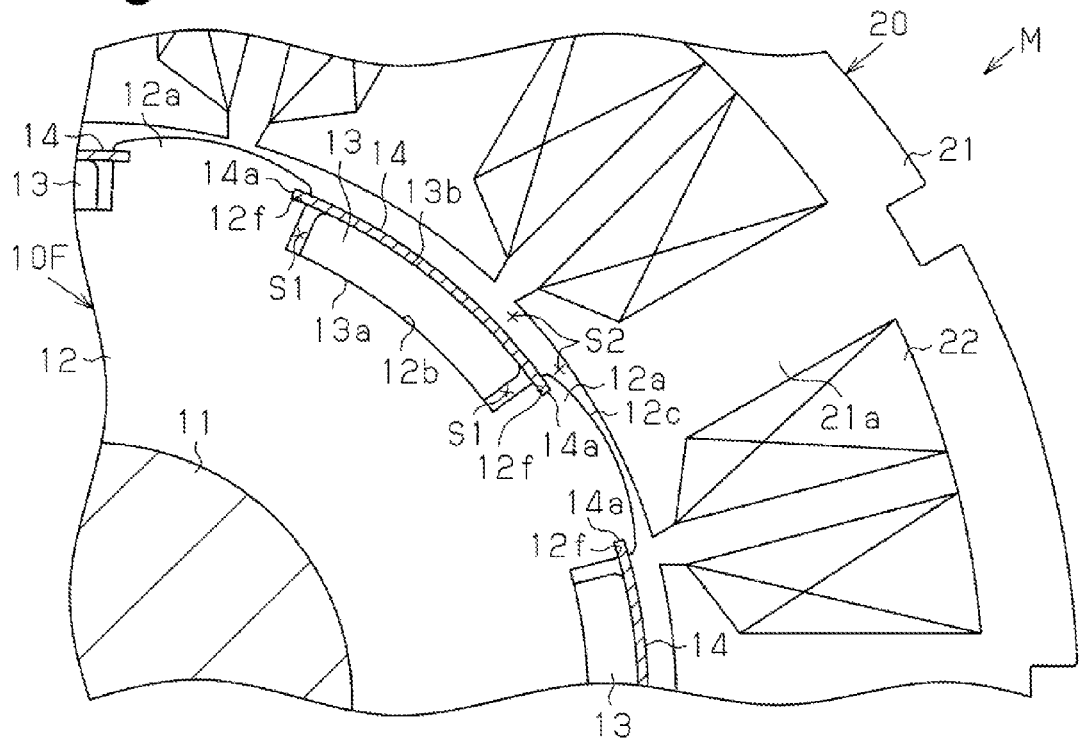
FIG. 33 is a partially enlarged view showing the motor of the ninth embodiment.

FIGS. 32 and 33 show an inner rotor type brushless motor M. The motor M of the ninth embodiment uses a rotor 10F including seven N-pole magnets 13, which are arranged along a circumferential direction of the rotor core 12, and salient poles 12a, which are formed integrally with the rotor core 12 and arranged between adjacent ones of the magnets 13 in the circumferential direction. The salient poles 12a function as S pole. In other words, the rotor 10F is a so-called consequent pole type having fourteen magnetic pole portions. The stator 20 includes twelve teeth 21a in the same manner as the first embodiment.

The magnet 13 has a circumferential length that is slightly longer than that of the salient pole 12a. The magnet 13 has a curved shape, the thickness (dimension in the radial direction) of which is constant in the circumferential direction. Accordingly, the inner surface 13a and the outer surface 13b of the magnet 13 are parallel. The fixation surface 12b of the rotor core 12 to which the inner surface 13a of the magnet 13 is fixed has a curved shape conforming to the inner surface 13a. A clearance (gap in the circumferential direction) S1 is formed between a magnet 13 and salient pole 12a that are arranged adjacent to each other in the circumferential direction. The outer surface 13b of each magnet 13 has a curved shape with a curvature that allows for the outer surfaces 13b of the other magnets 13 to be arranged on the same circumference.

The salient pole 12a has a circumferential length that is slightly shorter than that of the magnet 13. The salient pole 12a projects outward in the radial direction from the peripheral portion of the rotor 12 in an arcuate manner. Further, the salient pole 12a projects further outward in the radial direction from the outer surface 13b of the magnet 13. The outer surface 12c of the salient pole 12a has a curved shape with a larger curvature than the outer surface 13b of the magnet 13. The circumferential central part of the outer surface 12c is bulged outward from the two ends. The ends of the outer surface 12c are located outward in the radial direction from the outer surface 13b of the magnet 13. That is, the clearance S2 between the rotor 10F and the stator 20 in the portion of the salient pole 12a is less than the clearance S2 in the portion of the magnet 13. Further, the clearance S2 is gradually enlarged from the circumferential central part towards the ends of the outer surface 12c of the salient pole 12a.

A hooking groove 12f is formed in a distal portion in each of the two side surfaces of the salient pole 12a (portion located slightly before the distal corner of the salient pole 12a). A cover member 14 is attached to the two hooking grooves 12f formed in the side surfaces of the adjacent salient poles 12a that face toward each other. The cover member 14, which has a curved shape conforming to the outer surface 13b of the magnet 13, contacts the outer surface 13b. The cover member 14 has a length longer than the circumferential length between the adjacent salient poles 12a. The cover member 14 has two circumferential ends 14a, which are fitted into the hooking grooves 12f in the axial direction of the rotor 10F, for example, and fixed extending between the adjacent salient poles 12a. Such a cover member 14 is formed from a sheet of a nonmagnetic metal material such as stainless steel (SUS) or copper alloy that does not inhibit the magnetic field of the magnet 13. The cover member 14 prevents the magnet 13 from being separated from the fixation surface 12b. The cover member 14 is also arranged in correspondence with each magnet 13 so as to prevent chipped parts of the magnet 13 from scattering.

In the ninth embodiment, the salient pole 12a is projected out relative to the magnet 13. That is, the magnet 13 is arranged inward in the radial direction from the salient pole 12a, and the cover member 14 is arranged in the space formed by the inward arrangement. Accordingly, the cover member 14 covering the magnet 13 is arranged so as not to project outward in the radial direction from the salient pole 12a. That is, the salient pole 12a is not covered by the cover member 14 since the cover member 14 is obviously not necessary for the salient pole 12a. In addition, the arrangement of the cover member 14 minimizes the clearance S2, that is, the magnetic distance between the salient pole 12a and the stator 20b. Thus, the magnetic resistance between the salient pole 12a and the stator 20 remains small, and a decrease in the motor output is suppressed.

The ninth embodiment has the advantages described below.

(20) The rotor 10F of the ninth embodiment is formed so that the salient pole 12a projects outward in the radial direction relative to the magnet 13. The cover member 14, which covers the magnet 13, is hooked to the distal sides of the side surfaces that face toward each other in the adjacent salient poles 12a so as not to project outward in the radial direction from the salient pole 12a. That is, the salient pole 12a is not covered by the cover member 14, and the cover member 14 does not project outward in the radial direction from the salient pole 12a. This allows for the clearance S2 between the salient pole 12a portion and the stator 20 to be very small. Thus, the magnetic resistance between the salient pole 12a and the stator 20 remains small, and an output decreased of the motor M is suppressed.

(21) In the ninth embodiment, the cover member 14, which is formed from a sheet of a nonmagnetic metal material, is hooked to the hooking grooves 12, which are arranged in the distal sides of the salient poles 12a, to cover the magnet 13. That is, the heights (radial position) of the outer surface 13b of the magnet 13, which is covered by the cover member 14, and the distal end of the salient pole 12a are close. This allows for the hooking groove 12f for locking the cover member 14 to be arranged in the distal end of the salient pole 12a. In the ninth embodiment, the cover member 14 is just deformed into a curved shape. This simplifies the shape of the cover member 14 and facilitates processing.

The ninth embodiment may be modified as described below.

In the ninth embodiment, the cover member 14 is fitted into and fixed to the hooking grooves 12f arranged in the distal portions of the salient pole 12a. However, the fixation of the cover member 14 is not limited to such a structure.

Figure 34:
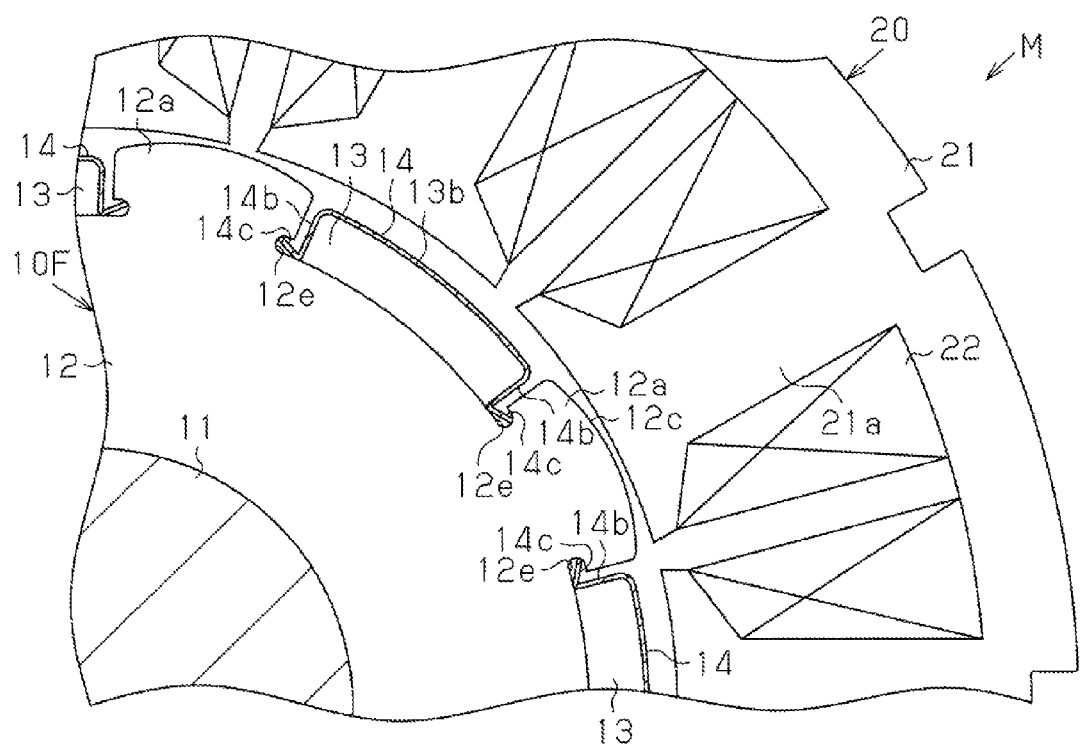
FIG. 34 is a partially enlarged view showing another example of a motor.

For example, as shown in FIG. 34, the side surfaces of two salient poles 12a that face toward each other may each include a semicircular hooking hole 12e arranged in a basal portion (basal end corner of the salient pole 12a). A cover member 14 has two end portions defining side walls 14b, which extend toward the basal end of the salient pole 12a while covering the two circumferential ends of the magnet 13. The distal end (inward end in the radial direction) of each side wall 14b is bent at an acute angle to form a hooking piece 14c. The hooking piece 14c has a distal end inserted into and hooked to the hooking hole 12e so that the cover member 14 is attached to the rotor core 12. The cover member 14 is attached from the outer side in the radial direction of the magnet 13. Specifically, the hooking piece 14c is resiliently deformed and inserted into the clearance S1 between the salient pole 12a and the magnet 13. The hooking piece 14c returns to its original form in the hooking hole 12e and thereby attaches the cover member 14. The cover member 14 may be attached from the axial direction by inserting the lock piece 14c into the lock hole 12e.

When the cover member 14 is attached using the structure described above, formation of the hooking hole 12e is necessary. The basal end corner of the salient pole 12a in which the hooking hole 12e is located is a portion in which the magnetic flux density variation is large and the magnetic flux amount is relatively small. Thus, the magnetic influence resulting from the formation of the hole is small. Further, the clearance S1 between the basal end of the salient pole 12a and the radially inward portion of the magnet 13 is enlarged. This decreases magnetic flux leakage.

The hooking groove 12f and the hooking hole 12e are formed in the salient pole 12a to hook the cover member 14, as described above. However, the salient pole 12a may include a projection. The cover member 14 may be hooked not only to the salient pole 12a but also to the fixation surface 12b.

Figure 35:
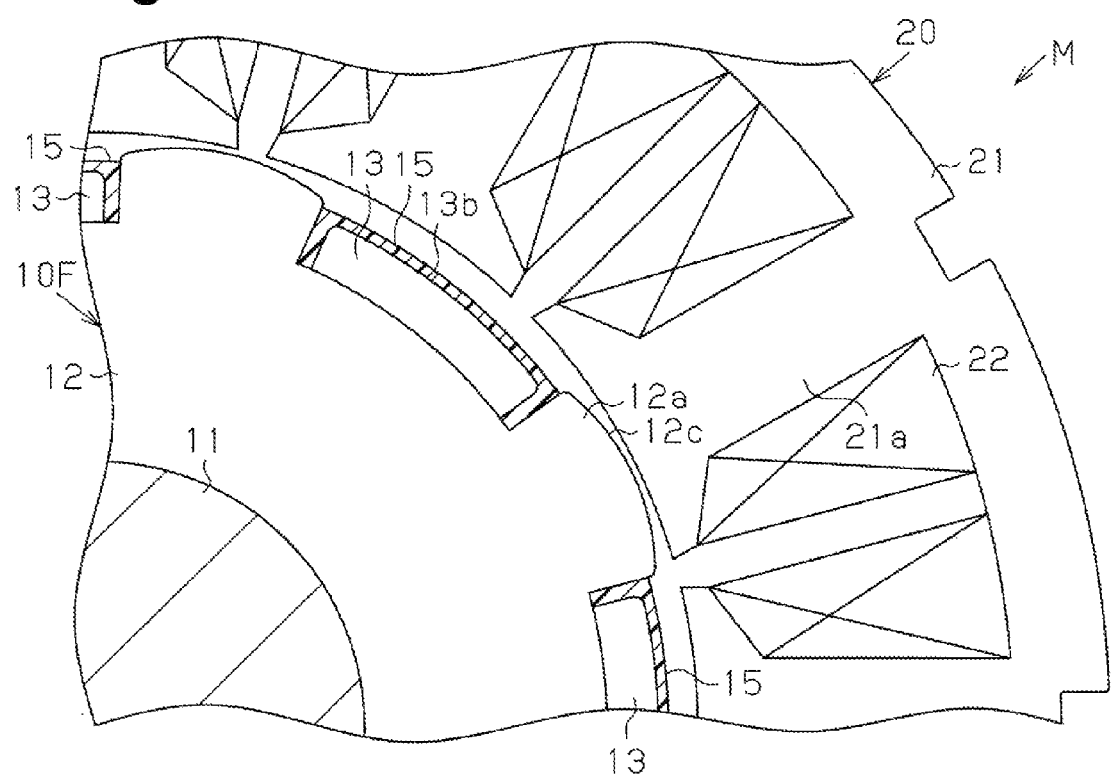
FIG. 35 is a partially enlarged view showing a further example of a motor.

For example, as shown in FIG. 35, a nonmagnetic resin material that covers the magnet 13 may be molded integrally molded with the rotor core 12 (fixed to the rotor core 12). This forms a resin cover 15 that does not project outward in the radial direction from the distal portion of the salient pole 12a. This reduces the number of components in the rotor 10. Further, the resin cover 15 may be formed in advance and be attached to the rotor 10F in the same manner as the cover member 14.

Although not particularly discussed in the ninth embodiment, the cover member 14 may be formed discretely for each magnet 13. However, for example, the cover members 14 may be formed integrally by coupling the cover members 14, which correspond to the magnet 13, at one side in the axial direction of the rotor 10F.

The ninth embodiment is applied to the rotor 10F including fourteen magnetic pole portions, seven salient poles 12a and seven magnets 13. However, the quantity of the magnetic pole portions may be changed as required. Further, the number of magnetic pole portions in the stator side may be changed accordingly.

What is claimed is:

1. A motor comprising:
    a rotor including a rotor core, a plurality of magnets arranged along a circumferential direction of the rotor core to function as first magnetic poles having a first polarity, and salient poles formed integrally with the rotor core and arranged between adjacent ones of the magnets in the circumferential direction to function as second magnetic poles having second polarity that differs from the first polarity; and
    a stator arranged facing toward the rotor and including a plurality of slots each defined between adjacent teeth and coils of three phases respectively wound around the teeth, wherein the coils of each phase are wound by concentric winding, wherein
    each of the salient poles has a middle, a first end and a second end in the circumferential direction and an outer end in a radial direction,
    a distance is defined between the outer end of the salient pole and a radially inner surface of the stator,
    each of the salient poles is configured to have the distance be constant along the circumferential direction between the first end and the second end so that each of the salient poles has a magnetic flux density that varies so that the magnetic flux density has two largest values in each salient pole wherein one of the largest value is located in an area between the middle and the first end of the salient pole, and the other largest value is located in an area between the middle and the second end of the salient pole,
    a clearance is formed between the magnet and the salient pole that are adjacent to each other in the circumferential direction of the rotor,
    each of the magnets has a magnetic pole occupying angle that is larger than a magnetic pole occupying angle of each of the salient poles,
    the two largest values of the magnetic flux density in the salient pole are larger than a largest value of a magnetic flux density in the magnet,
    the coils of each phase includes a coil of forward winding and a coil of reverse winding,
    when the tooth that includes the coil of the forward winding faces the magnet, the tooth that includes the coil of the reverse winding of the same phase as the coil of the forward winding faces the salient pole.

2. The motor according to claim 1, wherein the magnets and salient poles each have a quantity in which the quantities sum together to a quantity x1 of magnetic pole portions of the rotor, and the slots are in a quantity x2, in which x1<x2; and
    when an electrical angle corresponding to an angular range from an initiating point, which is set between each magnet and the salient pole that is adjacent to one side of the magnet in the circumferential direction, to a terminating point, which is set between the magnet and the salient pole that is adjacent to the other side of the magnet in the circumferential direction, is defined as a magnetic pole occupying angle $\theta 1$ of each of the magnets, and an electrical angle corresponding to an angular range between the initiating point and the terminating point on two sides of each salient pole in the circumferential direction is defined as a magnetic pole occupying angle θ2 of each of the salient poles, a sum of the magnetic pole occupying angle θ1 and the magnetic pole occupying angle θ2 is 360°; and the magnetic pole occupying angle θ1 is set in a range of 180°<θ1≤210°.

3. The motor according to claim 2, wherein a ratio x1:x2 of the quantity of the magnetic pole portions to the quantity of the slots in 3n−1:3n, wherein n being an odd number that is greater than or equal to 3; or the ratio x1:x2 of the quantity of the magnetic pole portions to the quantity of the slots is 3n−2:3n, wherein n being an even number that is greater than or equal to 4.

4. The motor according to claim 2, wherein the magnetic pole occupying angle θ1 is set in a range of 184°≤θ1≤202°.

5. The motor according to claim 2, wherein the magnetic pole occupying angle θ1 is set in a range of 188°≤θ1≤198°.

6. The motor according to claim 2, wherein the initiating point and the terminating point of each of the magnetic pole occupying angles θ1 and θ2 is a median point in the circumferential direction of the clearance.

7. The motor according to claim 1, wherein a value of the magnetic flux density at the middle in the radial direction of the salient pole is smaller than the two largest values.

8. The motor according to claim 1, wherein the magnets and salient poles each have a quantity in which the quantities sum together to a quantity x1 of magnetic pole portions of the rotor, and the slots are in a quantity x2, in which X1<X2; and when an electrical angle corresponding to an angular range from an initiating point, which is set between each magnet and the salient pole that is adjacent to one side of the magnet in the circumferential direction, to a terminating point, which is set between the magnet and the salient pole that is adjacent to the other side of the magnet in the circumferential direction, is defined as a magnetic pole occupying angle θ1 of each of the magnets, and an electrical angle corresponding to an angular range between the initiating point and the terminating point on two sides of each salient pole in the circumferential direction is defined as a magnetic pole occupying angle θ2 of each of the salient poles, a sum of the magnetic pole occupying angle θ1 and the magnetic pole occupying angle θ2 is 360°; and the magnetic pole occupying angle θ2 is set in a range of 150°<θ2≤180°.

9. The motor according to claim 8, wherein the magnetic pole occupying angle θ2 is set in a range of 158°<θ2<176°.

10. The motor according to claim 8, wherein the magnetic pole occupying angle θ2 is set in a range of 162°<θ2<172°.

* * * * *